US008200890B2

(12) United States Patent
Terasaki et al.

(10) Patent No.: US 8,200,890 B2
(45) Date of Patent: Jun. 12, 2012

(54) MEMORY CONTROLLER, FLASH MEMORY SYSTEM WITH MEMORY CONTROLLER, AND METHOD OF CONTROLLING FLASH MEMORY

(75) Inventors: Yukio Terasaki, Tokyo (JP); Takeshi Kamono, Tokyo (JP)

(73) Assignee: TDK Corporation, Tokyo (JP)

( * ) Notice: Subject to any disclaimer, the term of this patent is extended or adjusted under 35 U.S.C. 154(b) by 352 days.

(21) Appl. No.: 12/585,919

(22) Filed: Sep. 29, 2009

(65) Prior Publication Data

US 2010/0082889 A1    Apr. 1, 2010

(30) Foreign Application Priority Data

Sep. 30, 2008  (JP) .................................. 2008-252050

(51) Int. Cl.
  *G06F 13/00*  (2006.01)
  *G06F 13/28*  (2006.01)
  *G06F 3/00*   (2006.01)

(52) U.S. Cl. ................. 711/103; 711/155; 711/E12.008; 710/20

(58) Field of Classification Search .................. 711/103, 711/155, E12.008; 710/20
See application file for complete search history.

(56) References Cited

U.S. PATENT DOCUMENTS

| 6,370,619 | B1 * | 4/2002  | Ho et al. ........................ 711/129 |
| 6,658,533 | B1   | 12/2003 | Bogin et al. |
| 6,744,692 | B2   | 6/2004  | Shiota et al. |
| 6,882,568 | B2   | 4/2005  | Shiota et al. |
| 7,020,739 | B2   | 3/2006  | Mukaida et al. |
| 7,206,233 | B2   | 4/2007  | Shiota et al. |
| 7,450,457 | B2   | 11/2008 | Shiota et al. |
| 2003/0182534 | A1 * | 9/2003 | Harthcock ...................... 712/34 |
| 2007/0214310 | A1 * | 9/2007 | Ishimoto et al. .............. 711/103 |
| 2009/0024808 | A1 * | 1/2009 | Hillier et al. .................. 711/155 |

FOREIGN PATENT DOCUMENTS

| JP | A-2003-233529  | 8/2003 |
| JP | A-2007-520842  | 7/2007 |
| JP | A-2007-241896  | 9/2007 |
| JP | A-2008-197981  | 8/2008 |
| WO | WO 02/46929    | 6/2002 |
| WO | WO 2005/066974 | 7/2005 |

OTHER PUBLICATIONS

U.S. Appl. No. 12/585,911, filed Sep. 29, 2009, Mitsunaga et al.
U.S. Appl. No. 12/574,768, filed Oct. 7, 2009, Mitsunaga et al.
U.S. Appl. No. 12/588,311, filed Oct. 13, 2009, Terasaki.
Office Action dated on Nov. 17, 2011 from the U.S. Patent Office in related U.S. Appl. No. 12/585,911.
Office Action dated on Dec. 16, 2011 from the U.S. Patent Office in related U.S. Appl. No. 12/588,311.
Office Action dated on Dec. 16, 2011 from the U.S. Patent Office in related U.S. Appl. No. 12/574,768.

* cited by examiner

*Primary Examiner* — Edward Dudek, Jr.
(74) *Attorney, Agent, or Firm* — Posz Law Group, PLC

(57) ABSTRACT

First operations and second operations are performed in parallel. The first operations are operations to write first data to a first unit area which is any one of unit areas. The second operations are operations to read second data corresponding to the same logical page as first data from one or more flash memories and write the second data to a second unit area which is any one of the unit areas and different from the first unit area. Data transfer is performed between the first unit area and the second unit area so as to form data composed of the first data and a portion of the second data which is not replaced with the first data.

6 Claims, 18 Drawing Sheets

FLASH MEMORY

| VPN | 2a ↓ | 2b ↓ | 2c ↓ | 2d ↓ | 2e ↓ | 2f ↓ | 2g ↓ | 2h ↓ |
|---|---|---|---|---|---|---|---|---|
| #0 | PPN#0 | PPN#0 | PPN#0 | PPN#0 | PPN#0 | PPN#0 | PPN#0 | PPN#0 |
| #1 | PPN#1 | PPN#1 | PPN#1 | PPN#1 | PPN#1 | PPN#1 | PPN#1 | PPN#1 |
| #2 | PPN#2 | PPN#2 | PPN#2 | PPN#2 | PPN#2 | PPN#2 | PPN#2 | PPN#2 |
| #3 | PPN#3 | PPN#3 | PPN#3 | PPN#3 | PPN#3 | PPN#3 | PPN#3 | PPN#3 |
| #4 | PPN#4 | PPN#4 | PPN#4 | PPN#4 | PPN#4 | PPN#4 | PPN#4 | PPN#4 |
| #5 | PPN#5 | PPN#5 | PPN#5 | PPN#5 | PPN#5 | PPN#5 | PPN#5 | PPN#5 |
| #6 | PPN#6 | PPN#6 | PPN#6 | PPN#6 | PPN#6 | PPN#6 | PPN#6 | PPN#6 |
| #7 | PPN#7 | PPN#7 | PPN#7 | PPN#7 | PPN#7 | PPN#7 | PPN#7 | PPN#7 |
| #8 | PPN#8 | PPN#8 | PPN#8 | PPN#8 | PPN#8 | PPN#8 | PPN#8 | PPN#8 |
| #9 | PPN#9 | PPN#9 | PPN#9 | PPN#9 | PPN#9 | PPN#9 | PPN#9 | PPN#9 |
| #10 | PPN#10 | PPN#10 | PPN#10 | PPN#10 | PPN#10 | PPN#10 | PPN#10 | PPN#10 |
| #11 | PPN#11 | PPN#11 | PPN#11 | PPN#11 | PPN#11 | PPN#11 | PPN#11 | PPN#11 |
| #12 | PPN#12 | PPN#12 | PPN#12 | PPN#12 | PPN#12 | PPN#12 | PPN#12 | PPN#12 |
| #13 | PPN#13 | PPN#13 | PPN#13 | PPN#13 | PPN#13 | PPN#13 | PPN#13 | PPN#13 |
| #14 | PPN#14 | PPN#14 | PPN#14 | PPN#14 | PPN#14 | PPN#14 | PPN#14 | PPN#14 |
| #15 | PPN#15 | PPN#15 | PPN#15 | PPN#15 | PPN#15 | PPN#15 | PPN#15 | PPN#15 |
| . | . | . | . | . | . | . | . | . |
| . | . | . | . | . | . | . | . | . |
| #63 | PPN#63 | PPN#63 | PPN#63 | PPN#63 | PPN#63 | PPN#63 | PPN#63 | PPN#63 |

FIG.3

FLASH MEMORY

| VBN | 2a→PBA | 2b→PBA | 2c→PBA | 2d→PBA | 2e→PBA | 2f→PBA | 2g→PBA | 2h→PBA |
|---|---|---|---|---|---|---|---|---|
| #0 | #0 | #0 | #0 | #0 | #0 | #0 | #0 | #0 |
| #1 | #1 | #1 | #1 | #1 | #1 | #1 | #1 | #1 |
| #2 | #2 | #2 | #2 | #2 | #2 | #2 | #2 | #2 |
| #3 | #3 | #3 | #3 | #3 | #3 | #3 | #3 | #3 |
| #4 | #4 | #4 | #4 | #4 | #4 | #4 | #4 | #4 |
| #5 | #5 | #5 | #5 | #5 | #5 | #5 | #5 | #5 |
| #6 | #6 | #6 | #6 | #6 | #6 | #6 | #6 | #6 |
| #7 | #7 | #7 | #1016 | #7 | #7 | #7 | #7 | #7 |
| #8 | #8 | #8 | #8 | #8 | #8 | #8 | #8 | #8 |
| #9 | #9 | #9 | #9 | #9 | #9 | #9 | #9 | #9 |
| #10 | #10 | #10 | #10 | #10 | #10 | #10 | #10 | #10 |
| #11 | #11 | #11 | #11 | #11 | #11 | #11 | #11 | #11 |
| #12 | #12 | #12 | #12 | #12 | #12 | #12 | #12 | #12 |
| #13 | #13 | #13 | #13 | #13 | #13 | #13 | #13 | #13 |
| #14 | #14 | #14 | #14 | #14 | #14 | #1016 | #14 | #14 |
| #15 | #15 | #15 | #15 | #15 | #15 | #15 | #15 | #15 |
| . . | . . | . . | . . | . . | . . | . . | . . | . . |

FIG.4

| LBN | VBN |
|---|---|
| #0 | #11 |
| #1 | #0 |
| #2 | #3 |
| #3 | #14 |
| #4 | #47 |
| #5 | #33 |
| #6 | #15 |
| #7 | #22 |
| #8 | #6 |
| #9 | #8 |
| #10 | NA |
| #11 | #20 |
| #12 | #23 |
| #13 | #31 |
| #14 | #44 |
| #15 | #24 |
| . | . |
| . | . |

FIG.6

| VPN | 2a → | 2b → | 2c → | 2d → | 2e → | 2f → | 2g → | 2h → |
|---|---|---|---|---|---|---|---|---|
| #0 | PPN#0 | PPN#0 | PPN#0 | PPN#0 | PPN#0 | PPN#0 | PPN#0 | PPN#0 |
| #1 | PPN#1 | PPN#1 | PPN#1 | PPN#1 | PPN#1 | PPN#1 | PPN#1 | PPN#1 |
| #2 | PPN#2 | PPN#2 | PPN#2 | PPN#2 | PPN#2 | PPN#2 | PPN#2 | PPN#2 |
| #3 | PPN#3 | PPN#3 | PPN#3 | PPN#3 | PPN#3 | PPN#3 | PPN#3 | PPN#3 |
| #4 | PPN#4 | PPN#4 | PPN#4 | PPN#4 | PPN#4 | PPN#4 | PPN#4 | PPN#4 |
| #5 | PPN#5 | PPN#5 | PPN#5 | PPN#5 | PPN#5 | PPN#5 | PPN#5 | PPN#5 |
| #6 | PPN#6 | PPN#6 | PPN#6 | PPN#6 | PPN#6 | PPN#6 | PPN#6 | PPN#6 |
| #7 | PPN#7 | PPN#7 | PPN#7 | PPN#7 | PPN#7 | PPN#7 | PPN#7 | PPN#7 |
| #8 | PPN#8 | PPN#8 | PPN#8 | PPN#8 | PPN#8 | PPN#8 | PPN#8 | PPN#8 |
| #9 | PPN#9 | PPN#9 | PPN#9 | PPN#9 | PPN#9 | PPN#9 | PPN#9 | PPN#9 |
| #10 | PPN#10 | PPN#10 | PPN#10 | PPN#10 | PPN#10 | PPN#10 | PPN#10 | PPN#10 |
| #11 | PPN#11 | PPN#11 | PPN#11 | PPN#11 | PPN#11 | PPN#11 | PPN#11 | PPN#11 |
| #12 | PPN#12 | PPN#12 | PPN#12 | PPN#12 | PPN#12 | PPN#12 | PPN#12 | PPN#12 |
| #13 | PPN#13 | PPN#13 | PPN#13 | PPN#13 | PPN#13 | PPN#13 | PPN#13 | PPN#13 |
| #14 | PPN#14 | PPN#14 | PPN#14 | PPN#14 | PPN#14 | PPN#14 | PPN#14 | PPN#14 |
| #15 | PPN#15 | PPN#15 | PPN#15 | PPN#15 | PPN#15 | PPN#15 | PPN#15 | PPN#15 |
| . | . | . | . | . | . | . | . | . |
| . | . | . | . | . | . | . | . | . |
| #63 | PPN#63 | PPN#63 | PPN#63 | PPN#63 | PPN#63 | PPN#63 | PPN#63 | PPN#63 |

FLASH MEMORY

FIG.7

| LPN | VPN |
|---|---|
| #0 | #0 |
| #1 | #1 |
| #2 | #2 |
| #3 | #3 |
| #4 | #4 |
| #5 | #5 |
| #6 | #6 |
| #7 | #10 |
| #8 | #11 |
| #9 | #12 |
| #10 | NA |
| #11 | NA |
| #12 | NA |
| #13 | NA |
| #14 | NA |
| #15 | NA |
| · · | · · |
| #63 | NA |

FIG.9

| | 2a | 2b | 2c | 2d | 2e | 2f | 2g | 2h |
|---|---|---|---|---|---|---|---|---|
| 1ST SECTOR | SN#0 | SN#1 | SN#2 | SN#3 | SN#4 | SN#5 | SN#6 | SN#7 |
| 2ND SECTOR | SN#8 | SN#9 | SN#10 | SN#11 | SN#12 | SN#13 | SN#14 | SN#15 |
| 3RD SECTOR | SN#16 | SN#17 | SN#18 | SN#19 | SN#20 | SN#21 | SN#22 | SN#23 |
| 4TH SECTOR | SN#24 | SN#25 | SN#26 | SN#27 | SN#28 | SN#29 | SN#30 | SN#31 |
| 5TH SECTOR | SN#32 | SN#33 | SN#34 | SN#35 | SN#36 | SN#37 | SN#38 | SN#39 |
| 6TH SECTOR | SN#40 | SN#41 | SN#42 | SN#43 | SN#44 | SN#45 | SN#46 | SN#47 |
| 7TH SECTOR | SN#48 | SN#49 | SN#50 | SN#51 | SN#52 | SN#53 | SN#54 | SN#55 |
| 8TH SECTOR | SN#56 | SN#57 | SN#58 | SN#59 | SN#60 | SN#61 | SN#62 | SN#63 |

FLASH MEMORY

FIG.10B

| BPN | LBN/LPN |
|---|---|
| #0 | #0/#4 |
| #1 | #2/#0 |
| #2 | #0/#5 |
| #3 | #1/#8 |
| #4 | NA |
| #5 | #1/#9 |
| #6 | #0/#6 |
| #7 | NA |
| #8 | #1/#16 |
| #9 | #0/#7 |
| . | . |
| . | . |
| #15 | #2/#0 |
| #16 | #0/#0 |
| #17 | #0/#1 |
| #18 | #0/#2 |
| #19 | #0/#3 |
| #20 | #1/#4 |
| #21 | #1/#5 |
| . | . |
| . | . |
| #31 | #0/#18 |

FIG.10A

| BPN |
|---|
| #0 |
| #1 |
| #2 |
| #3 |
| #4 |
| #5 |
| #6 |
| #7 |
| #8 |
| #9 |
| . |
| . |
| #15 |
| #16 |
| #17 |
| #18 |
| #19 |
| #20 |
| #21 |
| . |
| . |
| #31 |

0–#15: FOR WRITE
16–#31: FOR READ

FIG.11A

HOST SYSTEM ⇒ BUFFER

| BPN | |
|---|---|
| #0 | #3 |
| #1 | #8 |
| #2 | #11 |
| #3 | #6 |
| #4 | #3 ←POINTER |
| #5 | #5 |
| #6 | #4 |
| #7 | #7 |
| #8 | #15 |
| #9 | #14 |
| #10 | #0 |
| ... | ... |
| #15 | #2 |

POINTER | #4

FIG.11B

BUFFER ⇒ FLASH MEMORY

| BPN | |
|---|---|
| #0 | #4 |
| #1 | #6 ←POINTER |
| #2 | #9 |
| #3 | #0 |
| #4 | #8 |
| #5 | #7 |
| #6 | #3 |
| #7 | #11 |
| #8 | #13 |
| #9 | #12 |
| #10 | #14 |
| ... | ... |
| #15 | #2 |

POINTER | #1

FIG.12

| BPN | LBN/LPN |
|---|---|
| #0 | #0/#4 |
| #1 | #2/#0 |
| #2 | #0/#5 |
| #3 | #1/#8 |
| #4 | NA |
| #5 | #1/#9 |
| #6 | #0/#6 |
| #7 | NA |
| #8 | #1/#16 |
| #9 | #0/#7 |
| ... | ... |
| #15 | #2/#1 |

⇑

| LBN/LPN |
|---|
| #0/#4 |
| #2/#0 |
| #0/#5 |
| #1/#8 |
| #1/#10 |
| #1/#9 |
| NA |
| #1/#11 |
| #1/#16 |
| NA |
| ... |
| #2/#1 |

FIG.13

| VBN | 2a → | 2b → | 2c → | 2d → | 2e → | 2f → | 2g → | 2h → |
|---|---|---|---|---|---|---|---|---|
| #7 | PBA#7 | PBA#7 | PBA#7 | PBA#7 | PBA#7 | PBA#7 | PBA#7 | PBA#7 |
| #15 | PBA#15 | PBA#15 | (PBA#235) | PBA#15 | PBA#15 | (PBA#15) | PBA#15 | PBA#15 |
| #101 | PBA#101 | (PBA#101) | PBA#101 | PBA#101 | PBA#101 | PBA#101 | PBA#101 | PBA#101 |
| #235 | PBA#235 | PBA#235 | PBA#235 | (PBA#235) | PBA#235 | PBA#235 | PBA#235 | PBA#235 |
| #288 | PBA#288 | PBA#288 | PBA#288 | PBA#288 | PBA#288 | PBA#288 | PBA#288 | (PBA#288) |
| #310 | (PBA#310) | PBA#310 | PBA#310 | PBA#310 | (PBA#310) | PBA#310 | PBA#310 | PBA#310 |
| #337 | PBA#337 | PBA#337 | PBA#337 | PBA#337 | PBA#337 | PBA#337 | (PBA#337) | PBA#337 |
| #399 | PBA#399 | PBA#399 | PBA#399 | PBA#399 | PBA#399 | (PBA#399) | PBA#399 | PBA#399 |
| ·· | · | · | · | · | · | · | · | · |
| #773 | PBA#773 | PBA#773 | (PBA#773) | PBA#773 | PBA#773 | PBA#773 | PBA#773 | PBA#773 |
| #862 | PPN#862 | (PPN#862) | PPN#862 | PPN#862 | PPN#862 | PPN#862 | PPN#862 | PPN#862 |
| #900 | PPN#900 | PPN#900 | PPN#900 | PPN#900 | PPN#900 | PPN#900 | PPN#900 | (PPN#900) |
| #997 | PPN#997 | PPN#997 | PPN#997 | PPN#997 | PPN#997 | PPN#997 | PPN#997 | (PPN#997) |
| #1016 | PPN#1016 | PPN#1016 | PPN#1016 | (PPN#1016) | PPN#1016 | PPN#1016 | PPN#1016 | PPN#1016 |

FLASH MEMORY

FIG.14

FLASH MEMORY

| VBN | 2a PBA | 2b PBA | 2c PBA | 2d PBA | 2e PBA | 2f PBA | 2g PBA | 2h PBA |
|---|---|---|---|---|---|---|---|---|
| #690 | #690 | #690 | #690 | #690 | DB | #690 | #690 | #690 |
| #740 | #740 | #740 | #740 | #740 | DB | #740 | DB | #740 |
| #773 | #773 | #773 | DB | #773 | DB | DB | #773 | #773 |
| #862 | DB | DB | #862 | #862 | DB | DB | #862 | DB |
| #900 | DB | #900 | #900 | #900 | DB | DB | #900 | DB |
| #997 | DB | DB | DB | DB | DB | DB | DB | DB |
| #1016 | DB | DB | DB | DB | DB | DB | DB | DB |

FIG.15

| SN#0 | SN#1 | SN#2 | SN#3 | SN#4 | SN#5 | SN#6 | SN#7 |
|---|---|---|---|---|---|---|---|
| SN#8 | SN#9 | SN#10 | SN#11 | SN#12 | SN#13 | SN#14 | SN#15 |
| SN#16 | SN#17 | SN#18 | SN#19 | SN#20 | SN#21 | SN#22 | SN#23 |
| SN#24 | SN#25 | SN#26 | SN#27 | SN#28 | SN#29 | SN#30 | SN#31 |
| SN#32 | SN#33 | SN#34 | SN#35 | SN#36 | SN#37 | SN#38 | SN#39 |
| SN#40 | SN#41 | SN#42 | SN#43 | SN#44 | SN#45 | SN#46 | SN#47 |
| SN#48 | SN#49 | SN#50 | SN#51 | SN#52 | SN#53 | SN#54 | SN#55 |
| SN#56 | SN#57 | SN#58 | SN#59 | SN#60 | SN#61 | SN#62 | SN#63 |

FIG.16

| | | | | | | | |
|---|---|---|---|---|---|---|---|
| | | | | WD | WD | WD | WD |
| WD | WD | WD | WD | | | | |
| WD | WD | WD | WD | WD | WD | WD | WD |
| WD | WD | WD | WD | WD | WD | WD | WD |
| WD | WD | WD | WD | WD | WD | WD | WD |
| WD | WD | WD | WD | | | | |
| WD | WD | WD | WD | WD | WD | WD | WD |
| WD | WD | WD | WD | | | | |
| WD | WD | WD | WD | | | | |
| | | | | | | | |
| WD | WD | WD | WD | WD | WD | WD | WD |
| WD | WD | WD | WD | WD | WD | WD | WD |
| WD | WD | WD | WD | WD | WD | WD | WD |
| | | | | | | | |
| | | | | | | | |
| | | | | WD | WD | WD | WD |
| | | | | | | | |
| WD | WD | WD | WD | WD | WD | WD | WD |
| WD | WD | WD | WD | | | | |
| WD | WD | WD | WD | WD | WD | WD | WD |
| WD | WD | WD | WD | WD | WD | WD | WD |
| | | | | WD | WD | WD | WD |
| WD | WD | WD | WD | WD | WD | WD | WD |
| | | | | | | | |
| | | | | WD | WD | WD | WD |
| WD | WD | WD | WD | WD | WD | WD | WD |
| WD | WD | WD | WD | WD | WD | WD | WD |
| WD | WD | WD | WD | WD | WD | WD | WD |
| WD | WD | WD | WD | WD | WD | WD | WD |
| WD | WD | WD | WD | WD | WD | WD | WD |
| WD | WD | WD | WD | | | | |
| . | . | . | . | . | . | . | . |
| . | . | . | . | . | . | . | . |
| WD | WD | WD | WD | | | | |
| | | | | WD | WD | WD | WD |
| WD | WD | WD | WD | WD | WD | WD | WD |
| WD | WD | WD | WD | WD | WD | WD | WD |
| WD | WD | WD | WD | WD | WD | WD | WD |
| WD | WD | WD | WD | | | | |
| | | | | | | | |
| | | | | | | | |

FIG.17

| | ←SN#7 | | | | | | | ←SN#63 |
|---|---|---|---|---|---|---|---|---|
| | WD | WD | WD | WD | WD | WD | WD | RD |
| | WD | WD | WD | WD | WD | WD | WD | RD |
| | WD | WD | WD | WD | WD | WD | WD | RD |
| | WD | WD | WD | WD | WD | WD | WD | RD |
| | RD | WD | WD | WD | WD | WD | WD | WD |
| | RD | WD | WD | WD | WD | WD | WD | WD |
| | RD | WD | WD | WD | WD | WD | WD | WD |
| | RD | WD | WD | WD | WD | WD | WD | WD |

SN#0 ↑   BPN#3   SN#56 ↑

FIG.18A

| | | | | | | | | |
|---|---|---|---|---|---|---|---|---|
| SN#0 → | | | | | | | | ← SN#7 |
| | | | | | WD | WD | WD | WD |
| | WD | WD | WD | WD | WD | WD | WD | WD |
| BPN#4 | WD | WD | WD | WD | WD | WD | WD | WD |
| | WD | WD | WD | WD | WD | WD | WD | WD |
| | WD | WD | WD | WD | WD | WD | WD | WD |
| | | | | | | | | |
| SN#56 → | | | | | | | | ← SN#63 |

FIG.18B

| | | | | | | | | |
|---|---|---|---|---|---|---|---|---|
| SN#0 → | RD | RD | RD | RD | RD | RD | RD | RD ← SN#7 |
| | RD | RD | RD | RD | RD | RD | RD | RD |
| | RD | RD | RD | RD | RD | RD | RD | RD |
| BPN#7 | RD | RD | RD | RD | RD | RD | RD | RD |
| | RD | RD | RD | RD | RD | RD | RD | RD |
| | RD | RD | RD | RD | RD | RD | RD | RD |
| | RD | RD | RD | RD | RD | RD | RD | RD |
| SN#56 → | RD | RD | RD | RD | RD | RD | RD | RD ← SN#63 |

FIG.18C

| | | | | | | | | |
|---|---|---|---|---|---|---|---|---|
| SN#0 → | RD | RD | RD | RD | RD | RD | RD | RD ← SN#7 |
| | RD | RD | RD | RD | WD | WD | WD | WD |
| | WD | WD | WD | WD | WD | WD | WD | WD |
| BPN#4 | WD | WD | WD | WD | WD | WD | WD | WD |
| | WD | WD | WD | WD | WD | WD | WD | WD |
| | WD | WD | WD | WD | WD | WD | WD | WD |
| | RD | RD | RD | RD | RD | RD | RD | RD |
| SN#56 → | RD | RD | RD | RD | RD | RD | RD | RD ← SN#63 |

MEMORY CONTROLLER, FLASH MEMORY SYSTEM WITH MEMORY CONTROLLER, AND METHOD OF CONTROLLING FLASH MEMORY

CROSS-REFERENCE TO PRIOR APPLICATIONS

This application relates to and claims the benefit of priority from Japanese Patent Application number 2008-252050, filed on Sep. 30, 2008, the entire disclosure of which is incorporated herein by reference.

This application is related to copending Japanese Patent Application number 2008-252033, filed on Sep. 30, 2008 (U.S. application Ser. No.: 12/585,911 filed Sep. 29, 2009), Japanese Patent Application number 2008-260366, filed on Oct. 7, 2008 (U.S. application Ser. No.: 12/574,768 filed Oct. 7, 2009), and Japanese Patent Application number 2008-266409, filed on Oct. 15, 2008 (U.S. application Ser. No.: 12/588,311 filed Oct. 13, 2009), commonly assigned with the present invention.

BACKGROUND

The present invention generally relates to a memory controller for a flash memory, a flash memory system having the memory controller, and a method of controlling the flash memory.

As described in Reference 1 (JP-A-2003-233529), a storage apparatus employing a flash memory as a storage medium has a buffer memory in which data read from the flash memory and data to be written to the flash memory, so as to absorb a difference between an operating speed of a host system and that of the flash memory, or a difference between an access speed of a host system and a writing (programming)/reading speed of the flash memory.

Further, in the storage apparatus, it is general to write data in parallel to the plurality of flash memories and read data in parallel from the plurality of flash memories so as to improve a substantial access speed to the storage apparatus. For example, the following memory access technique is described in Reference 2 (WO 2002/046929). In the memory access technique, virtual blocks are formed by virtually combining a plurality of physical blocks each included in each of flash memories, and data writing to the virtual block and data reading therefrom are performed. Therefore, data are written in parallel to the flash memories and data are read in parallel therefrom.

SUMMARY

In the host system, data stored in the storage apparatus are managed on a basis of an address assigned each sector (e.g. 512 bytes). While, in the flash memory employed as a storage medium, data writing and data reading are performed in pages. The page (e.g. the physical page), which is a unit of data writing and data reading, generally has a storage capacity of a plurality of sectors.

Further, in a case where date are written in parallel to a plurality of flash memories or date are read in parallel from a plurality of flash memories, the virtual blocks each composed of a plurality of physical blocks each included in each of the flash memories are formed, and a plurality of physical page each included in each of the physical blocks belonging to the same virtual block are managed as single page combined virtually. Therefore, the physical pages of the same number as the number of physical blocks composing a virtual block are treated as a virtual page, and data writing and data reading are performed in virtual pages.

In a case where data writing or data reading is performed in virtual pages, it is necessary for the buffer memory to have storage capacity at least equal to storage capacity of the single virtual page. And in a case where data corresponding to a plurality of virtual pages are held in the buffer memory, it is necessary to determine a priority order of data held in the buffer memory, which data are supplied from the host system, in operations to write the data to the flash memory. A structure and a managing method of the buffer memory to hold data corresponding to a plurality of virtual pages affects access speed of a flash memory system.

This is a problem not only for a flash memory system like the above storage apparatus but for the general flash memory system including the following elements (A) and (B):

(A) a flash memory which has a plurality of physical pages each having a capacity corresponding to a plurality of sectors; and (B) a buffer memory comprising unit areas each of which holds data corresponding to a logical page composed of a plurality of sectors.

Therefore, It is an object of the present invention to improve an access speed, which is a writing speed and reading speed, to the flash memory systems having the buffer memory comprising unit areas each of which holds data corresponding to a logical page composed of a plurality of sectors.

The present invention generally relates to a memory system employing a flash memory as a storage medium. The flash memory has erasable non-volatile memory cells. The non-volatile memory cells are divided into physical pages. And the physical pages are divided into physical blocks. Each of the physical pages is a unit of programming (writing) or reading. Each of the physical blocks is a unit of erasing.

The memory system comprises a memory controller controlling the flash memory. In the memory system connected to a host system, the memory controller controls access to the flash memories on a basis of an access request from the host system.

According to the present invention, a memory controller comprises a logical page forming unit, a data holding unit, a management unit, a control unit, a first access unit, a second access unit, and a data transfer unit.

The logical page forming unit forms logical pages each composed of a plurality of logical sectors each assigned a logical address provided from a host system.

The data holding unit has a plurality of unit areas each for holding data corresponding to one logical page.

The management unit manages a relationship between the logical pages and the unit areas.

The control unit writes data provided from the host system to one or more unit areas of the unit areas according to the relationship between the logical pages and the unit areas managed by the management unit.

The first access unit stores data held in one or more unit areas of the unit areas in the flash memory.

The second access unit reads data from the flash memories and write the read data to one or more unit areas of the unit areas.

The data transfer unit transfers data from any one of the unit areas to another unit area of the unit areas.

First operations and second operations are performed in parallel. The first operations are operations for the control unit to write first data to a first unit area which is any one of the unit areas. The second operations are operations for the second access unit to read second data corresponding to the same logical page as first data from the flash memories and write the second data to a second unit area which is any one of the unit areas and different from the first unit area. The data transfer unit performs data transfer between the first unit area and the second unit area so as to form data composed of the first data and a portion of the second data which is not replaced with the first data.

According to the present invention, in the flash memory system having the buffer memory comprising unit areas each of which holds data corresponding to a logical page composed of a plurality of sectors, access speed can be improved.

It is preferable that the data transfer unit transfers the first data from the first unit area to the second unit area in a case where a total amount of the first data is smaller than a half amount of data corresponding one logical page, and transfers the second data from the second unit area to the first unit area in a case where a total amount of the first data equals or exceeds a half amount of data corresponding to one logical page.

It is preferable that the memory controller further comprises a virtual block forming unit, a first virtual block management unit, a relationship management unit, a second virtual block management unit, a defective virtual block management unit, and a third virtual block management unit.

The virtual block forming unit forms virtual blocks each composed of a plurality of physical blocks each included in each of the flash memories.

The first virtual block management unit maintains identification information to identify physical blocks composing each of the virtual blocks formed by the virtual block forming unit.

The relationship management unit manages a relationship between logical blocks each composed of a plurality of logical pages and the virtual blocks formed by the virtual block forming unit.

The second virtual block management unit which forbids use of a virtual block to which at least one defective physical block newly generated belongs.

The defective virtual block management unit manages a virtual block of which use is forbidden by the second virtual block management unit as a defective virtual block.

The third virtual block management unit generates a virtual block to which no defective physical block belongs by replacing a defective physical block belonging to one defective virtual block with a normal physical block belonging to another defective virtual block among defective virtual blocks and allows use of the virtual block generated.

BRIEF DESCRIPTION OF THE DRAWINGS

FIG. 3 shows an example of a virtual block table.

FIG. 4 shows an example of the address translation table.

FIG. 6 shows a relationship between virtual pages and physical pages.

FIG. 7 shows an example of a page information table.

FIG. 9 shows a relationship sector areas in physical pages composing a virtual page and logical sector areas in a logical page.

FIG. 10A shows an example of a buffer.

FIG. 10B shows an example of a buffer management table.

FIG. 11A shows an example of a destination management table

FIG. 11B shows an example of a source management table.

FIG. 12 is illustration for explaining update of the buffer management table.

FIG. 13 is illustration for explaining a replacement of temporary virtual blocks.

FIG. 14 shows an example of a defective virtual block management table.

FIG. 15 is illustration for explaining a buffer page.

FIG. 16 is illustration for explaining the buffer.

FIG. 17 shows data held in the buffer.

FIG. 18A shows the buffer page of BPN #4 before performing data transfer.

FIG. 18B shows the buffer page of BPN #7 before performing data transfer.

FIG. 18C shows the buffer page of BPN #4 after performing data transfer.

DETAILED DESCRIPTION OF THE EMBODIMENT

Figure 1:
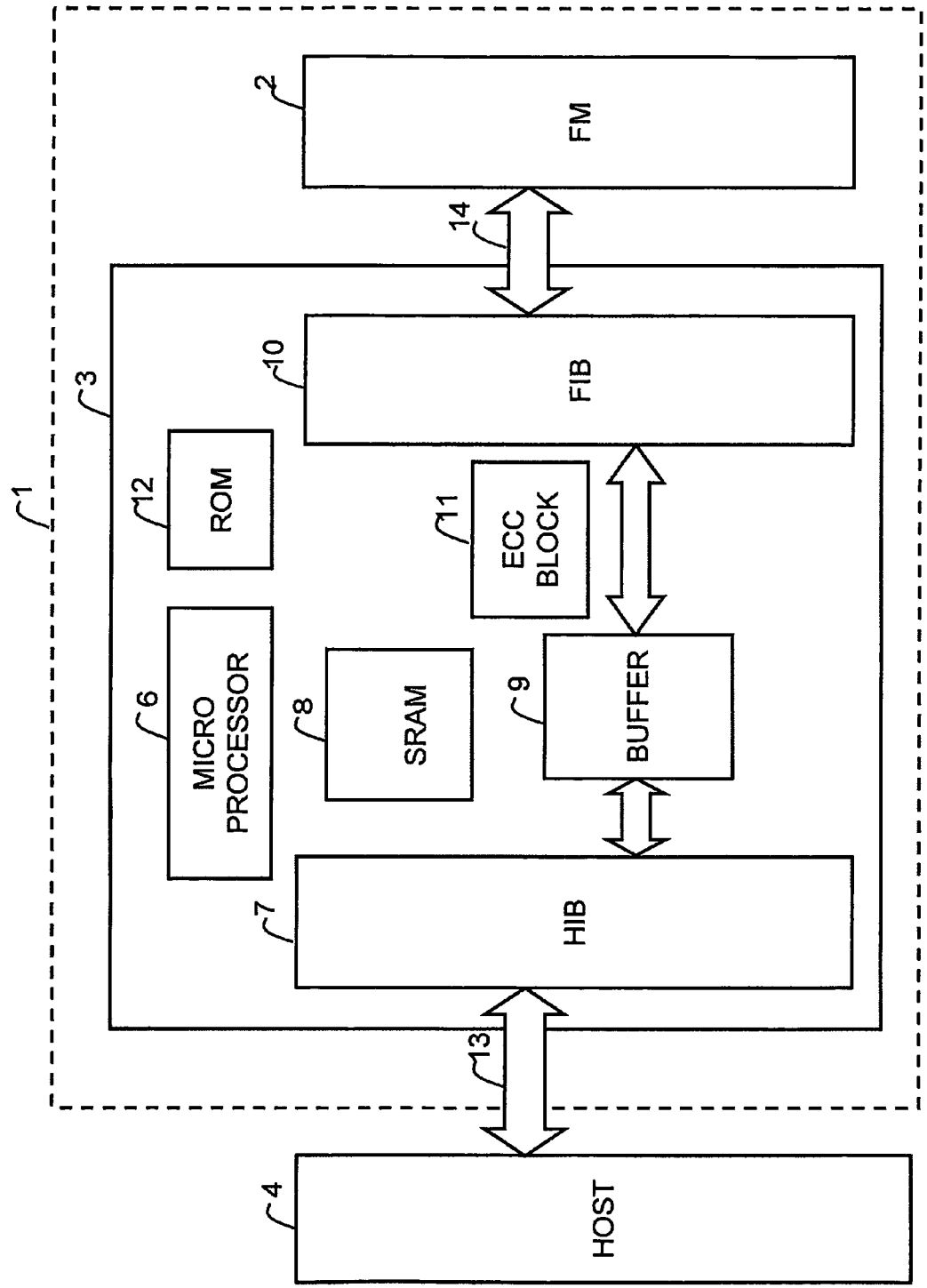
FIG. 1 shows a configuration of a flash memory system in accordance with an embodiment of the present invention.

FIG. 1 is a block diagram schematically showing the structure of a flash memory system 1 as specific embodiment of the present invention. The flash memory system 1 shown in FIG. 1 employs a plurality of flash memories as a storage medium. Further, a plurality of virtual blocks are formed. Each of the virtual blocks is composed of a plurality of physical blocks. Each of the physical blocks composing each virtual block is included in each of flash memories.

As shown in FIG. 1, the flash memory system 1 includes a flash memory (FM) 2 and a memory controller 3 to control the flash memory 2. Incidentally, in FIG. 1, a plurality of flash memories are shown as the flash memory 2. Hereinafter, there might be a case where "the flash memory 2" is used as a generic name of the plurality of flash memories. Next, each functional block will be described in detail.

A host interface block (HIB) 7 receives data, address information, external commands, and so on from a host system (HOST) 4. Also, the host interface block 7 sends data, status information, and so on to the host system 4. The external command is for the host system 4 to control the memory controller 3. Data and so on supplied from the host system 4 to the flash memory system 1 are input into functional blocks included in the flash memory system 1, for example a buffer memory 9, through the host interface block 7 as an inlet for data. Also, data and so on supplied from the flash memory system 1 to the host system 4 are supplied to the host system 4 through the host interface block 7 as an outlet for data.

A SRAM (Static Random Access Memory) 8 is a volatile memory for temporarily holding data required for controlling the flash memory 2. For example, a defective block table, an address translation table, a free block table and so on are prepared and updated on the SRAM 8. Hereupon, the defective block table includes information designating a defective block. The address translation table includes information indicating a relationship between logical blocks and the virtual blocks (or the physical blocks). The free block table is used to search the virtual block (or the physical block) which is in erased state, or the virtual block (or the physical block) not storing valid data, for example, the virtual block (or the physical block) storing only invalid data. At least one of these tables may be stored in the flash memory 2 or in a nonvolatile RAM (Random Access Memory) such as FeRAM (Ferroelectric Random Access Memory).

A ROM 12 is a nonvolatile memory. In the ROM 12, firmware required for controlling the flash memory 2 is stored. Incidentally, only minimum firmware required for booting may be stored in the ROM 12 and the other firmware may be stored in the flash memory 2.

A buffer memory 9 is a volatile memory to temporarily hold data supplied from the host system 4 and data read from the flash memory 2. In this embodiment, A DRAM (Dynamic Random Access Memory) is employed as the volatile memory. The buffer memory 9 will be described in detail later.

A flash memory interface block (FIB) 10 reads a sequence code from the ROM 12 or the flash memory. The sequence code specifies various operations performed by the flash memory interface block 10. The flash memory interface block 10 performs the various operations on a basis of the sequence code read. The sequence code is composed of a plurality of code sets. The code set comprises a plurality of codes. Each of the code sets specifies the operations corresponding thereto. In the operations performed on a basis of the sequence code, between the flash memory interface block 10 and the flash memory 2, data, address information, status information, internal commands and so on are transferred through a internal bus 14. Hereupon, the internal command is for the memory controller 3 to control the flash memory 2, and the flash memory 2 works according to the internal command. Incidentally, before the operations are performed, the sequence code stored in the flash memory 2 is read from the flash memory 2 and is written to the SRAM 8.

An ECC block 11 generates an ECC (Error Correcting Code) pertaining to data to be written to the flash memory 2. Data are stored together with the ECC pertaining thereto. Further the ECC block 11 detects and corrects bit errors in data read from the flash memory 2 on a basis of the ECC pertaining to the read data.

A microprocessor 6 reads a program code from the ROM 12 or the flash memory 2, and controls all functional blocks included in the memory controller 3 according to the program code read. The program code specifies operating of the microprocessor 6. The microprocessor 6 controls access to the flash memory 2 on a basis of the program code read. Incidentally, the program code stored in the flash memory 2 is read from the flash memory 2 and written to the SRAM 8 at a time when the flash memory system is booted.

The flash memory 2 is NAND type flash memory. The flash memory 2 is provided with a register and a memory cell array formed from a plurality of memory cells arranged in a matrix. The memory cell array comprises a plurality of memory cell strings and a plurality of word lines. Hereupon, each of the memory cell strings comprises a plurality of memory cells connected in series. The word lines are used to select a memory cell from the each memory cell string. In data writing, data retained in the register are stored in the memory cells selected by using the word lines. In data reading, data read from the memory cells selected by using the word lines are retained in the register. Incidentally, in general NAND type flash memories, some NAND type flash memories comprises memory cells of SLC (Single Level Cell) type, and others comprises memory cells of MLC (Multi Level Cell) type.

In the NAND type flash memory, data reading and data writing are performed in pages (in physical pages), and data erasing is performed in blocks (in physical blocks). That is, a physical page is a unit of data reading or data writing, and a physical block is a unit of data erasing. Incidentally, the physical page comprises a user area in which user data supplied from the host system 4 are stored mainly and a redundant area in which additional data such as ECC are stored mainly. General NAND type flash memories might have physical pages each including the user area whose capacity is 4 sectors (2048 bytes) or 8 sectors (4096 bytes). Flash memories vary in a capacity of the redundant area. In a case where, in the flash memories, at least one of a manufacturer, a type of the memory cell (SLC or MLC), a capacity of the physical page, and so on is different from one another, a capacity of the redundant area is generally different from one another. The flash memories vary in the number of physical pages composing a physical block. For example, the number of physical pages composing a physical block is 64 or 128. In this embodiment, the flash memory system 1 employing a NAND type flash memory having physical blocks each comprising 64 physical pages each having a user area of 8 sectors (4096 bytes) will be described.

The pieces of the additional data to be stored in the redundant area are the ECC (Error Correcting Code), logical address information, a block status (flag) and so on. The logical address information is information to identify a logical block assigned to a physical block. A logical block corresponding to each physical block is identified on a basis of logical address information stored therein. The block status is a flag indicating whether or not a physical block is a defective block, which can not operate normally in data writing or data reading. The defective block is identified on a basis of the block status. Incidentally, among the defective blocks, there are an initial defective block and a running defective block. The initial defective block is a defective block detected before the flash memory is shipped out of the factory. The running defective block is a defective block generated by deterioration after apparatus employing a flash memory is in use. The block status indicating the initial defective block is written before shipping. In flash memories of some manufacturers, the block status indicating the initial defective block is written to the user area. A criterion to determine (judge) whether or not a physical block is the running defective block is a matter of design. Also, the criterion is defined appropriately. For example, in a case where an error status as operation status is output from the flash memory, in a case where the number of bit errors in data read from the flash memory is more than a predetermined number, or in a case where some of these cases and so on are combined, the relevant physical block is determined (judged) to be the running defective block.

Figure 2:
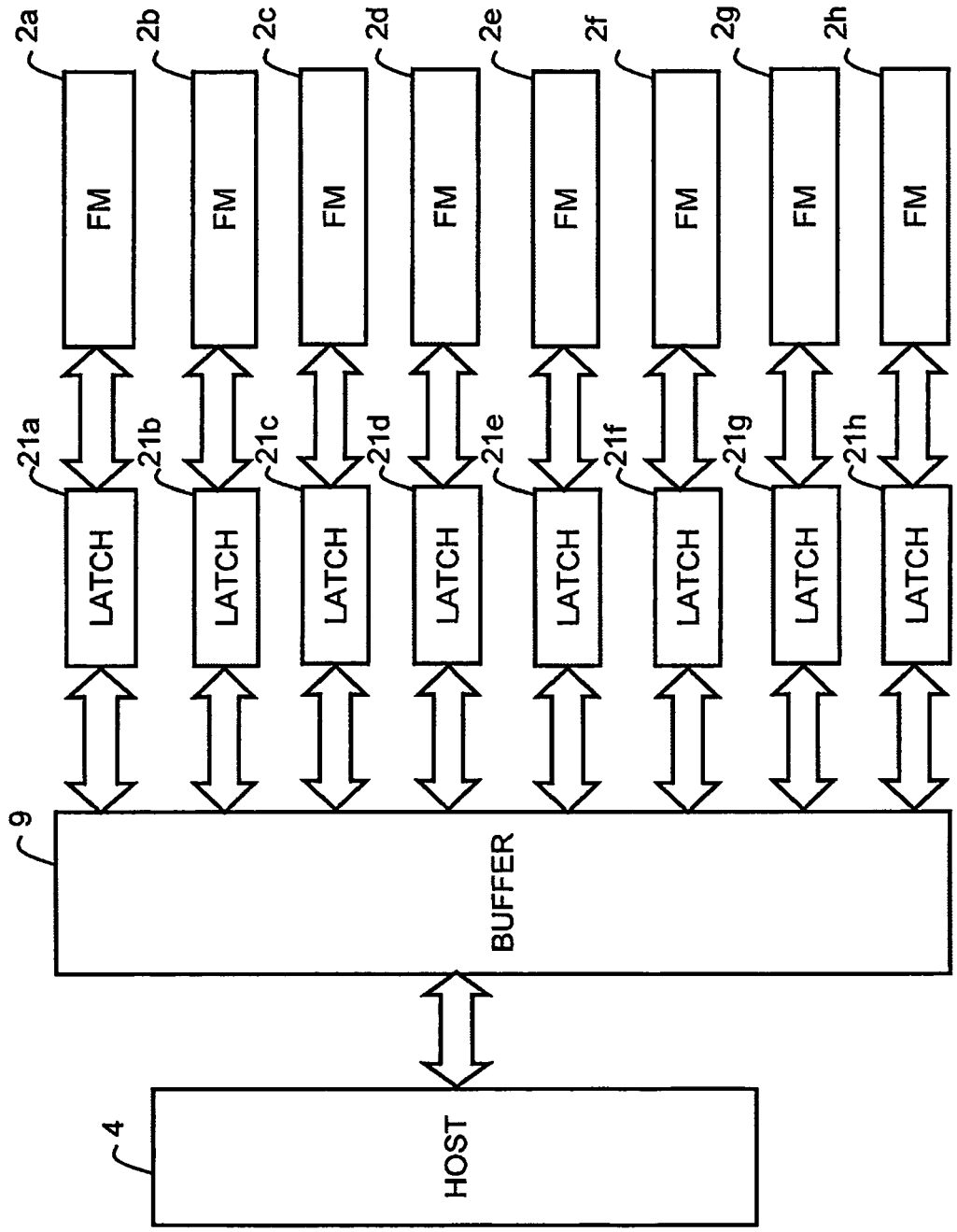
FIG. 2 is illustration for explaining data input/output between 8 flash memories and a buffer.

In this embodiment, as shown in FIG. 2, the flash memory interface 10 is configured to perform parallel access to 8 flash memories comprising the flash memories 2a to 2h. Specifically, the flash memory interface 10 is configured so that data writing to the 8 flash memories are performed in parallel and a data reading from the 8 flash memories are performed in parallel. Data to be written to the 8 flash memories comprising the flash memories 2a to 2h are output from the buffer memory 9, and then the data are supplied to the flash memory 2a to 2h through (via) latch circuits 21a to 21h. The write data output from the buffer memory 9 are input into the latch circuits 21a to 21h in a time-sharing manner (time shared manner). Data read from the 8 flash memories comprising the flash memories 2a to 2h are input into the buffer memory 9 through (via) the latch circuits 21a to 21h. The read data to be input into the buffer memory 9 are output from the latch circuits 21a to 21h in the time-sharing manner (time shared manner). Incidentally, the buffer memory 9 is configured so that data inputting/outputting on a side of the host system 4 and data inputting/outputting on a side of the flash memories 2a to 2h are performed in the time-sharing manner (time shared manner).

In a case where the memory controller 3 performs parallel access to the 8 flash memories comprising the flash memories 2a to 2h, the memory controller 3 forms virtual blocks each composed of 8 physical blocks each included in each of the flash memories 2a to 2h. Also, the memory controller 3 treats the 8 physical blocks as one virtual block, and assigns one logical block to one virtual block. For example, virtual blocks are managed using a virtual block table as shown in FIG. 3. As shown in FIG. 3, the virtual block table indicates the relationship between a virtual block number (VBN), which is a serial number assigned to each virtual block, and 8 physical block addresses (PBAs) each corresponding to each of 8 physical blocks composing each virtual block. Therefore, by referring to the virtual block table, the relationship between each virtual block and component physical blocks thereof (8 PBAs of 8 physical blocks composing each virtual block) can be found. For example, By referring to the virtual block table shown in FIG. 3, it is found that a virtual block of VBA #0 is composed of the physical block of PBA #0 included in the flash memory 2a, that of PBA #0 included in the flash memory 2b, that of PBA #0 included in the flash memory 2c, that of PBA #0 included in the flash memory 2d, that of PBA #0 included in the flash memory 2e, that of PBA #0 included in the flash memory 2f, that of PBA #0 included in the flash memory 2g, and that of PBA #0 included in the flash memory 2h. That is, component physical blocks of a virtual block of VBA #0 are 8 physical blocks of PBA #0 each included in each of the flash memories 2a to 2h. PBAs of physical blocks composing each virtual block may be not the same value (component physical blocks of each virtual block may not have the same PBA), but, in consideration of managing the virtual block and so on, it is preferable that each virtual blocks are composed of the physical blocks whose PBAs are the same value. Hereupon, in a case where at least one of 8 physical blocks, each of which is included in each of the flash memories 2a to 2h, whose PBAs are the same value is a defective block, the relevant defective block is replaced with another physical block, whose PBA is different from PBA of the relevant defective block. For example, in a case where a physical block of PBA #7 included in the flash memory 2c is the defective block, a physical block of PBA #7 is replaced with a physical block of PBA #1016. As a result, a physical block of PBA #1016 becomes one of physical blocks composing a virtual block of VBN #7 (a physical block of PBA #1016 becomes a component physical block of a virtual block of VBN #7).

Incidentally, it is preferable that 8 physical blocks composing each virtual block (component physical blocks of each virtual block) are predetermined. And it is preferable that none of 8 physical blocks composing a virtual block is replaced with another physical block except a case where any of the 8 physical blocks becomes defective. PBAs of physical blocks composing each of only virtual blocks except composed of physical blocks having the same PBA may be held in the virtual block table. Specifically, PBAs of physical blocks composing each of only virtual blocks such as a virtual block of VBA #7 or VBA #15 shown in FIG. 3 may be held in the virtual block table. In FIG. 3, a virtual block of VBA #7 is composed of physical blocks of PBA #7 and a physical block of PBA #1016, and a virtual block of VBA #15 is composed of physical blocks of PBA #15 and a physical block of PBA #1016. In other words, the virtual block table may contain only information indicating physical blocks composing each of virtual blocks such as a virtual block of VBA #7 or VBA #15 in FIG. 3.

Address space in the host system 4 is managed in a basis of LBAs (Logical Block Addresses) which are serial numbers assigned to logical sectors each of which is a sector corresponding to 512 bytes. In address management performed by the memory controller 3, logical blocks into which logical sectors are grouped (divided) are formed, and each virtual block storing valid data is assigned to each logical block. Each LBN (Logical Block Number) is assigned to each logical block. Each of LBNs is a serial number assigned to each of logical blocks to identify each of them. In this embodiment, each user area included in each physical block has a capacity of 512 sectors, and each virtual block is composed of the 8 physical blocks each include in each of flash memories. Therefore, each logical block is formed with 4096 logical sectors whose LBAs are serial. For example, a logical block of LBN (Logical Block Number) #0 is formed with the 4096 logical sectors of LBAs #0 to #4095. Each virtual block storing valid data is assigned to each logical block composed of 4096 logical sectors. The relationship between logical blocks and virtual blocks is managed in a basis of a address translation table indicating the relationship between LBNs (Logical Block Numbers) and VBNs (virtual Block Numbers). In FIG. 4, an example of the address translation table is shown. In the address translation table, for example, it is shown to assign a virtual block of VBN #11 to a logical block of LBN #0, a virtual block of VBN #0 to a logical block of LBN #1. Incidentally, hereupon, the flash memory system 1 is configured so that a capacity of a logical block equals a capacity of total user areas included in a virtual block, but a capacity of a logical block may be smaller than a capacity of total user areas included in a virtual block.

In this embodiment, data supplied from the host system 4 are held in the buffer memory 9 first. When necessity to write data held in the buffer memory 9 to the flash memory 2 arises, the memory controller 3 performs data writing. When the memory controller 3 writes data held in the buffer memory 9 to the flash memory 2, the memory controller 3 identifies physical blocks composing a virtual block to which data are written in a basis of the address translation table and the virtual block table. Specifically, a virtual block assigned to the logical block corresponding data to be written is identified in a basis of the address translation table and physical blocks composing the virtual block are identified in a basis of the virtual block table. The memory controller 3 writes data to the physical blocks identified in this way. Because the physical blocks identified in this way are each included in each of the flash memories 2a to 2h, data writing to the physical blocks can be performed in parallel.

When the memory controller 3 writes data held in buffer memory 9 to the flash memory 2, in a case where a virtual block is not assigned to a logical block corresponding to the data to be written, or in a case where a free area, in which data can be stored, or free page, in which data are not stored yet, does not exist in physical blocks composing a virtual block assigned to the logical block corresponding thereto, the memory controller 3 assigns a virtual block in which data are not stored yet, hereinafter referred as a "free virtual block", to the logical block corresponding thereto. Specifically, in this case, the memory controller 3 searches a free virtual block, and assigns the free virtual block searched out to a logical block corresponding to data to be written.

Figure 5:
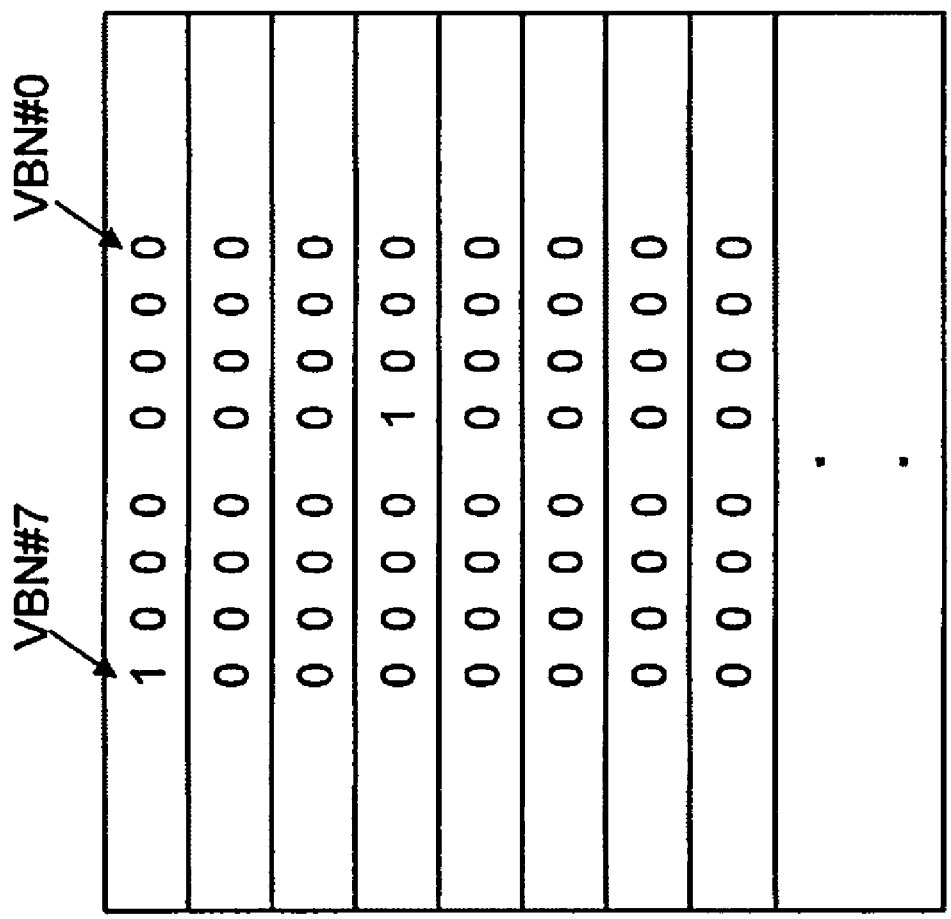
FIG. 5 shows an example of a search table.

Incidentally, because 8 physical blocks composing each virtual block (component physical blocks of each virtual block) are predetermined, the free virtual block search is performed in virtual blocks. Therefore, in the free virtual block search, each virtual block corresponds to a searching unit, that is, each virtual block is treat as one unit. For example, the free virtual block search is performed using a search table as shown in FIG. 5. In the search table, each virtual block is assigned to any one of bits constituting the search table, and a logical value, "0" or "1", of each bit indicates whether or not a virtual block assigned thereto is a free virtual block. Assuming that a free virtual block corresponds to a logical value "1", the free virtual block search will be described. Hereupon, if virtual blocks of VBN #0 to #7 are assigned to 8 bits constituting a upper 1st raw in order from LSB (Least Significant Bit) to MSB (Most Significant Bit) respectively, a virtual block of VBN #7 corresponding to MSB in the upper 1st raw is a free virtual block, but virtual blocks of VBN #0 to #6 corresponding to lower 7 bits in the upper 1st raw are not a free virtual block. In the free virtual block search, a bit corresponding to a logical value "1" is searched in the search table. When data are written to a free virtual block, a logical value of a bit corresponding the free virtual block is changed from "1" to "0". Reversely, when a virtual block in which data are stored becomes a free virtual block, a logical value of a bit corresponding the virtual block changed from "0" to "1".

Next, virtual pages composing a virtual block will be described. The memory controller 3 treats each virtual block as comprising virtual pages. Each of the virtual pages is composed of physical pages each included in each of physical blocks composing each virtual block. Incidentally, in each virtual block, physical pages composing each virtual page are predetermined (component physical pages of each virtual page are predetermined). Specifically, the relationship between each virtual page number (VPN), which is a serial number assigned to each of the virtual pages composing each virtual block, and each physical page number (PPN), which is a serial number assigned to each of the physical pages composing each physical block, is predetermined. In FIG. 6, the relationship between the virtual pages and the physical pages is shown. In this embodiment, each virtual page is composed of 8 physical pages each included in each of 8 physical blocks composing a virtual block. For example, the virtual page of VPN #0 is composed of the 8 physical pages of PPN #0 included in each of the flash memories 2a to 2h, the virtual page of VPN #1 is composed of the 8 physical pages of PPN #1 included in each of the flash memories 2a to 2h, the virtual pages of VPN #2 to VPN #62 are composed similarly, and the virtual page of VPN #63 is composed of the 8 physical pages of PPN #63 included in each of the flash memories 2a to 2h. Specifically, each virtual page is composed of a 8 physical pages whose PPNs are the same value Also, each of the 8 physical pages whose PPNs are the same value is included in each of 8 physical blocks composing a virtual block. In other wards, in a case where each virtual block is treated as comprising virtual pages, component physical pages of each virtual page have the same PPN and each included in each of component physical blocks of each virtual block.

The memory controller 3 forms logical pages into which logical sectors composing each logical block are grouped and treats each logical block as comprising logical pages. Specifically, the memory controller 3 treats the plurality of logical sectors as a logical page and the plurality of logical pages as a logical block. In other words, each logical block is composed of plural logical pages, and each logical page is composed of plural logical sectors. In this embodiment, the memory controller 3 treats 64 logical sectors as one logical page and 64 logical pages as one logical block. The memory controller 3 identifies a virtual page corresponding to a logical page requested for data writing or data reading on a basis of a page information table to manage the relationship between logical pages and virtual pages. The page information table indicates the relationship between logical page numbers (LPNs) and virtual page numbers (VPNs). Each logical page number (LPN) is a serial number assigned to each of logical pages among each logical block. Each virtual page number (VPN) is a serial number assigned to each of virtual pages among each virtual block. In FIG. 7, an example of the page information table is shown. For example, in the page information table, a logical page of LPN #0 corresponds to a virtual page of VPN #0, a logical page of LPN #7 corresponds to a virtual page of VPN #7, a logical pages of LPN #10 to #15 corresponds to no virtual page, shown as "NA". It is preferable that LPN corresponding to data to be written to user areas of 8 physical pages composing a virtual page is written to redundant areas thereof to identify a logical page corresponding to the virtual page. By writing LPN, which corresponds to data to be written to user areas, to the redundant areas, which correspond to the user areas to which the data is written, the relationship between logical pages and virtual pages can be managed on a basis of LPNs stored in redundant areas. Incidentally, because 8 physical pages composing each virtual page is predetermined, LPN may be written to the redundant area of any one of the 8 physical pages.

Figure 8:
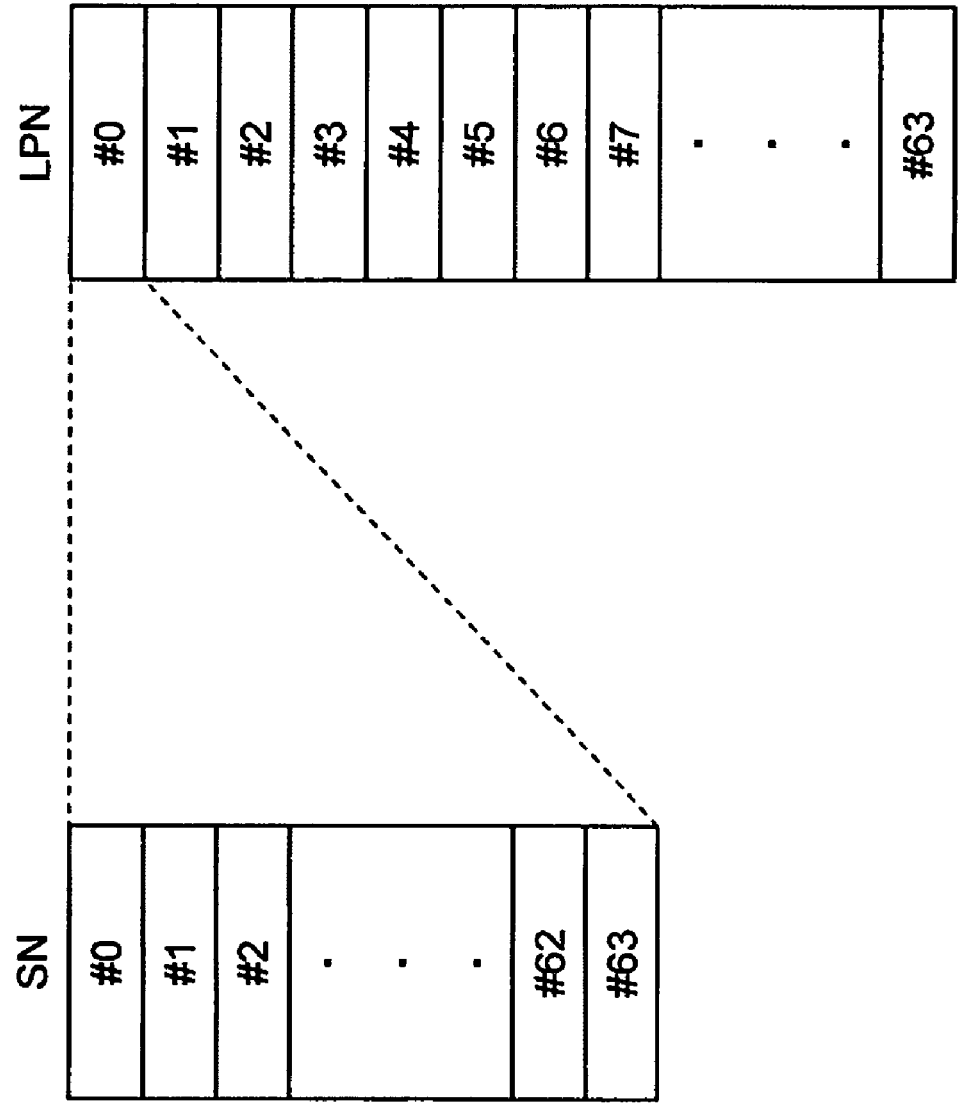
FIG. 8 is illustration for explaining a logical page and a logical sector area.

The memory controller 3 treats a user area of each physical page as comprising a plurality of sector areas. Each of the sector areas has a capacity of 512 bytes. In this embodiment, a user area of each physical page is divided into 8 sector areas comprising 1st sector area to 8th sector area. Next, a relationship between 64 sector areas belonging to 8 physical pages composing each virtual page and 64 logical sectors composing each logical page will be described. As shown in FIG. 8, a logical block is composed of logical pages of LPN #0 to #63, each of which is composed of 64 logical sectors. For convenience of description, a serial number by each logical page is assigned to each of logical sectors composing each logical page. Hereinafter, this serial number is referred as a "sector number (SN)". Specifically, SN #0 to #63 is assigned to 64 logical sectors composing a logical page.

In FIG. 9, the relationship between logical sectors of SN #0 to #63 composing a logical page and the 1st sector area to the 8th sector area belonging to each of 8 physical pages composing a virtual page is shown. Each of 8 physical pages composing a virtual page is included in each of the 8 flash memories 2a to 2h and has 8 sector areas comprising the 1st sector area to the 8th sector area. A virtual page composed of 8 physical pages has 64 sector areas. In this embodiment, a logical sector of SN #0 corresponds to the 1st sector area belonging to a physical page included in the flash memory 2a, a logical sector of SN #1 corresponds to the 1st sector area belonging to a physical page included in the flash memory 2b, hereinafter similarly, logical sectors of SN #2 to #7 correspond to the 1st sector areas belonging to physical pages included in the flash memories 2c to 2h respectively. Next, a logical sector of SN #8 corresponds to the 2nd sector area belonging to a physical page included in the flash memory 2a, a logical sector of SN #9 corresponds to the 2nd sector area belonging to a physical page included in the flash memory 2b, logical sectors of SN #10 to #15 correspond similarly to the 2nd sector areas belonging to physical pages included in the flash memory 2c to 2h respectively. In this way, logical sectors of SN #0 to #63 correspond to the 1st sector area to the 8th sector area belonging to each physical page included in each of the flash memories 2a to 2h.

Next, the buffer memory 9 in this embodiment will be described. In this embodiment, an area among the buffer memory 9 is divided into a plurality of units each of which has a capacity equal to a logical page. Specifically, the buffer memory 9 is composed of a plurality of units. Hereinafter, the unit having a capacity equal to a logical page is referred as a "buffer page", and a serial number assigned to the buffer pages is referred as a "buffer page number (BPN)".

The buffer memory 9 and a buffer management table, which is a table to manage data held in the buffer memory 9, in this embodiment are shown in FIG. 10A and FIG. 10B respectively. The buffer memory 9 comprises buffer pages of BPN #0 to #31. The buffer pages of BPN #0 to #15 are assigned to the buffer page for writing hereinafter referred as a "writing buffer page". The buffer pages of BPN #16 to #31 are assigned to the buffer page for reading, hereinafter referred as a "reading buffer page". Specifically, data supplied from the host system 4 are held in buffer pages of BPN #0 to #15, and data read from the flash memory 2 are held in buffer pages of BPN #16 to #31. The relationship between a logical page and data held in each buffer page is managed using a buffer management table. Specifically, data held in buffer pages are managed on a basis of the buffer management table in logical pages. That is, each buffer page holds data by a logical page, and the relationship a buffer page holding data and a logical page corresponding to the data held therein is managed on a basis of the buffer management table.

In the buffer management table, information indicating a logical page corresponding to data held in a buffer page is held. For example, information indicating LBN of a logical block and LPN of a logical page belonging the logical block is held. In other words, information indicating the logical page assigned to each buffer page holding data is held. For example, in the buffer management table shown in FIG. 10B, it is indicated that a logical page of LPN #4 belonging to a logical block of LBN #0 is assigned to a buffer page of BPN #0, a logical page of LPN #0 belonging to a logical block of LBN #2 is assigned to a buffer page of BPN #1, and a logical page of LPN #5 belonging to a logical block of LBN #0 is assigned to a buffer page of BPN #2. Incidentally, none of logical pages is assigned to buffer pages of BPN #4 and BPN #7. Therefore, valid data are not held in the buffer pages of BPN #4 and BPN #7.

When data to be held in the buffer memory 9 are supplied from the host system 4, it is determined whether or not there is a buffer page to which a logical page corresponding to the data is assigned. In a case where there is a buffer page to which a logical page corresponding to data supplied from the host system 4 is assigned, the data are held therein. In this case, the data supplied from the host system 4 is overwritten on old data (data before update), held therein. The old data (the data before update), corresponds to the same logical page as the data supplied from the host system 4.

In a case where there is not a buffer page to which a logical page corresponding to data supplied from the host system 4 is assigned, the logical page corresponding to the data is newly assigned to a buffer page in which valid data are not held or a buffer page to which any logical page is not assigned, hereinafter referred as a "free buffer page". Also, the data are written to the buffer page to which the logical page corresponding to the data is newly assigned. Further, information indicating LBN of a logical block to which the newly assigned logical page belongs and LPN of the newly assigned logical page is written to a location, which is included in the buffer management table, corresponding to the free buffer page to which it is newly assigned.

The memory controller 3 manages order of priority among the buffer pages. Writing buffer pages (buffer pages of BPN #0 to #15) and reading buffer pages (buffer pages of BPN #16 to #31) are prioritized separately. In the writing buffer pages, order of priority is managed so as to give the highest priority to a buffer page to which data are just written. Specifically, higher priority is given to a buffer page to which data are written more recently. Therefore, priority of a buffer page to which the newest data among data held therein were written the latest is the highest, and priority of a buffer page to which the newest data among data held therein ware written the earliest is the lowest. In the reading buffer pages, order of priority is managed so as to give the highest priority to the buffer page from which data are just read. In other words, order of priority is managed so as to give the highest priority to a buffer page in which data just supplied to the host system 4 are held. Specifically, higher priority is given to a buffer page from which data are read more recently. Therefore, priority of a buffer page from which the most recently data reading is performed the latest is the highest, and priority of a buffer page from which the most recently data reading is performed the earliest is the lowest.

In management of the writing buffer pages in this embodiment, the writing buffer pages are managed so that the predetermined number of free buffer pages exists anytime. Therefore, when the remaining number of free buffer pages decreases by assigning logical page thereto, data held in a buffer page are written to the flash memory 2 for getting the same number of free buffer pages as the decreasing number of free buffer pages. In the data write operations to write data held in a writing buffer page to the flash memory 2, data held in a writing buffer page of low priority precedes that of high priority. Specifically, data are written to the flash memory 2 in order from data held in a buffer of the lowest priority. For example, in a case where 2 free buffer pages are newly got, data held in 2 writing buffer pages whose priorities are the lowest and the 2nd lowest are written to the flash memory 2, and each of the 2 writing buffer pages become a free buffer page. Further, when a free buffer page is newly got, information indicating not to assign the logical page thereto is written to a location, which is included in the buffer management table, corresponding to the free buffer page.

Because such the management of the writing buffer pages is performed, in a normal operating, a data write operations to write data held in a writing buffer page to the flash memory 2 is performed only when it is necessary for a free buffer page to be newly got. Because a writing buffer page assigned to a logical page corresponding to data to be often rewritten (corresponding to data to be often updated) has relatively high priority anytime, data held in such the writing buffer page are generally updated in the writing buffer page. Specifically, data held in such the writing buffer page are overwritten in the writing buffer page. Therefore, only when it is necessary for data held in such the writing buffer page to be backed up to the flash memory 2, data held therein are written to the flash memory 2. For example, when the host system 4 is shut down, data held in writing buffer pages are written to the flash memory 2.

In management of the reading buffer pages in this embodiment, replacement of data held in a buffer of low priority precedes that of high priority. Specifically, data is replaced in order from data held in the buffer of the lowest priority. Incidentally, in a case where a free buffer page exists, data read from the flash memory 2 are held therein. Therefore, the management of the reading buffer pages in a case where a free buffer page does not exist will be described in detail.

When an access request for data reading is supplied from the host system 4, the memory controller 3 determines on a basis of the buffer management table whether or not data corresponding to logical sector(s) designated by the access request, hereinafter referred as a "designated sector(s)", are held in any of the writing buffer pages or the reading buffer pages in a case where data corresponding to a logical page to which a designated sector(s) belongs are held in any of the writing buffer pages or the reading buffer pages, data held therein are supplied to the host system 4. Incidentally, in a case where data corresponding to a logical page to which a designated sector(s) belongs are held in both a writing buffer page and a reading buffer page, data held in the writing buffer page precede data held in the reading buffer page. Specifically, in this case, data held in a writing buffer page are supplied to the host system 4.

In a case where data corresponding to a logical page to which a designated sector(s) belongs are not held in any buffer pages, data corresponding thereto are read from the flash memory 2, and the data read from the flash memory 2 are held in the reading buffer page of the lowest priority. Then, the data held therein are supplied to the host system 4. Further, information indicating LBN of a logical block to which the logical page corresponding to the data newly held in the reading buffer page belongs and LPN of the logical page corresponding to the data is written to a location, which is included in the buffer management table, corresponding to the reading buffer page. Incidentally, when the data held in the reading buffer page are supplied to the host system 4, order of priority is updated so that priority of the reading buffer page becomes the highest.

For example, in a case where a logical page to which a designated sector(s) belongs is a logical page of LPN #7 belonging to the logical block of LBN #3, and data corresponding to the logical page are not held in any buffer pages, the data corresponding thereto are read from the flash memory 2 and are held in a reading buffer page of the lowest priority. Hereupon, in a case where the reading buffer page of the lowest priority is buffer page of BPN #20, data corresponding to a logical page of LPN #7 belonging to a logical block of LBN #3 are held in a buffer page of BPN #20. Then, by holding data corresponding to a logical page of LPN #7 belonging to a logical block of LBN #3 in a buffer page of BPN #20, information indicating #3 as LBN of a logical block to which the logical page belongs and #7 as LPN of the logical page is written to a location, which is included in the buffer management table, corresponding to a buffer page of BPN #20. Incidentally, when data held in a buffer page of BPN #20 are supplied to the host system 4, order of priority is updated so that priority of a buffer page of BPN #20 becomes the highest.

Next, operations of holding data supplied from the host system 4 in the buffer memory 9 and operations of writing data held in the buffer memory 9 to the flash memory 2 will be described specifically. For example, the operations will be described on the assumption that scope of LBAs corresponding to designated sectors designated by an access request for data writing supplied from the host system 4 corresponds to logical pages of LPN #8 to #11 belonging to logical block of LBN #1. Specifically, about a case where data corresponding to logical pages of LPN #8 to #11 belonging to a logical block of LBN #1 are supplied from the host system 4 and the data are held in writing buffer pages, the operations will be described. Further, in the following, it is assumed that the writing buffer pages are managed so that the 2 free buffer pages exist (remain) anytime.

When an access request for (requiring) data writing is supplied, the memory controller 3 determines whether or not there is a writing buffer page to which each of logical pages of LPN #8 to #11 belonging to a logical block of LBN #1 is assigned. As shown in FIG. 10B, in a case where a logical page of LPN #8 and that of LPN #9 belonging to a logical block of LBN #1 are assigned to a buffer pages of BPN #3 and that of BPN #5 respectively, data corresponding to a logical pages of LPN #8 are held in a buffer pages of BPN #3 and data corresponding to a logical pages of LPN #9 are held in a buffer pages of BPN #5. In a case where neither of logical pages of #10 and #11 belonging to a logical block of LBN #1 is assigned to any buffer page, data corresponding to the logical pages are held in buffer pages of BPN #4 and #7 which are the free buffer page. Specifically, a logical page of #10 belonging to a logical block of LBN #1 is assigned to a buffer page of BPN #4 and a logical page of #11 belonging to a logical block of LBN #1 is assigned to a buffer page of BPN #7.

The memory controller 3 in this embodiment is provided with a destination management table for controlling to write data supplied from the host system 4 to which writing buffer pages. In FIG. 11A, an example of the destination management table is shown. The destination management table has 16 entries to hold BPNs of buffer pages. As to data to be supplied from the host system 4, one or more BPNs of buffer pages to which the data are written are set in one or more entries in predetermined order. A buffer page to which data to be supplied from the host system 4 are written is selected on a basis of BPN held in an entry designated by a pointer. Specifically, a buffer page of BPN held in an entry designated by a pointer is selected.

Data corresponding to logical pages of LPN #8 to #11 are supplied from the host system 4 in order of LPN. Therefore, setting of the destination management table is performed so that data of the 1st logical page, which corresponds to a logical page of LPN #8, are held in a buffer page of BPN #3, data of the 2nd logical page, which corresponds to a logical page of LPN #9, are held in a buffer page of BPN #5, data of the 3rd logical page, which corresponds to a logical page of LPN #10, are held in a buffer page of BPN #4, and data of the 4th logical page, which corresponds to a logical page of LPN #11, are held in a buffer page of BPN #7. Specifically, as shown in FIG. 11A, #3 as BPN is set in an entry #4, #5 as BPN is set in an entry #5, #4 as BPN is set in an entry #6, and #7 as BPN is set in an entry #7. When BPN of buffer page to which data are written is set in the destination management in this way, the setting of BPN starts from an entry designated by the pointer and one or more BPNs are written to one or more entries in order of a number assigned to each of the 16 entries. Therefore, as shown in FIG. 11A, in a case where #4 as a number designating an entry is set in the pointer, the setting of BPN starts from an entry of #4. Incidentally, a number set in the pointer is advanced to the next number when a logical page corresponding to data supplied from the host system 4 changes to the next logical page.

The memory controller 3 in this embodiment performs operations to hold data supplied from the host system 4 in buffer memory 9 in parallel with operations to write data held in the buffer memory 9 to the flash memory 2. Specifically, inputting, where data supplied from the host system 4 are input to the buffer memory 9, and outputting, where data to be supplied to the flash memory 2 are output from the buffer memory 9, are performed in a time-sharing manner (time shared manner). Hereupon, in a case where data supplied from the host system 4 are held in 2 free buffer pages of BPN #4 and #7, it is necessary for 2 free buffer pages to be newly got. Therefore, operations to write data held in buffer pages (writing buffer pages) of the lowest priority and the 2nd lowest priority to the flash memory 2 are performed.

In a case where writing buffer page of the lowest priority is a buffer page of BNP #6 and writing buffer page of the 2nd lowest priority is a buffer page of BNP #9, operations to write data held in buffer pages of BPN #6 and #9 to the flash memory 2 are performed so that the buffer pages of BNP #6 and #9 become the free buffer page. Incidentally, in a case where all data corresponding to logical sectors composing a logical page are held in a buffer page, the all data held in a buffer page are written to the flash memory 2 as it stands. In a case where partial data of the all data are not held in a buffer page, data corresponding to the same logical sector(s) as the partial data are read from the flash memory 2 and the read data complement data held in the buffer page. However, in a case where data corresponding to the same logical sector(s) as the partial data are not stored in the flash memory 2, the operations of complementing are not performed. In a case where, in this way, the partial data, which correspond to some logical sectors included in a logical page, are read from flash memory 2 and the read data complement data held in the buffer page, after completing the operations of complementing, the complemented data, which is held in the buffer page, are written to the flash memory 2.

The memory controller 3 in this embodiment is provided with a source management table for controlling to supply data held in which buffer page to the flash memory 2 in data write operations. In FIG. 11B, an example of the source management table is shown. This source management table has 16 entries to hold BPNs of the buffer pages. As to data to be supplied to the flash memory 2 in data write operations, one or more BPNs of buffer pages in which the data are held are set in one or more entries in predetermined order. A buffer page in which data to be supplied to the flash memory 2 are held is selected on a basis of BPN held in the entry designated by a pointer. Specifically, the buffer page of BPN held in the entry designated by a pointer is selected.

In a case where data held in buffer pages of BPN #6 and #9 are written to the flash memory 2, as shown in FIG. 11B, #6 as BPN is set in an entry #1 and #9 as BPN is set in an entry #2. Also, when BPN of buffer page in which data to be supplied to the flash memory 2 are held is set in source management table, the setting of BPN starts from an entry designated by a pointer and one or more BPNs are written to one or more entries in order of a number assigned to each of the 16 entries. Therefore, as shown in FIG. 11B, in a case where #1 as a number designating an entry is set in the pointer, setting of BPN starts from an entry #1. Incidentally, a number set in the pointer is advanced to the next number when a logical page corresponding to data supplied from the host system 4 changes to the next logical page.

In a case where a logical page corresponding to any of buffer pages changes to another logical page by writing data held in the buffer memory 9 to the flash memory 2 or holding data supplied from the host system 4 in the buffer memory 9, the buffer management table is updated. In the case described above, free buffer pages of BPN #4 and #7 are assigned to logical pages of LPN #10 and #11 belonging to a logical block of LBN #1 respectively, buffer pages of BPN #6 and #9 become the free buffer page. Therefore, the buffer management table is updated according to this change.

In this update of the buffer management table, as shown in FIG. 12, information held in a location, which is included the buffer management table, corresponding to a buffer page of BPN #4 is changed from information indicating a free buffer page, shown as "NA" in FIG. 12, to information indicating a logical page of LPN #10 belonging to a logical block of LBN #1, information held in a location corresponding to a buffer page of BPN #7 is changed from information indicating a free buffer page to information indicating a logical page of LPN #11 belonging to a logical block of LBN #1, and information held in locations corresponding to buffer pages of BPN #6 and #9 are changed to information indicating free buffer page.

Next, a method for determining the physical blocks composing each virtual block will be described. In this embodiment, first, virtual blocks each composed of 8 physical blocks whose PBAs are the same value are formed temporarily. Each of the 8 physical blocks whose PBAs are the same value is included in each of the 8 flash memories 2a to 2h. Specifically, a virtual block of VBN #0 is composed of 8 physical blocks of PBA #0 and each of 8 physical blocks of PBA #0 are included in each of the flash memories 2a to 2h, a virtual block of VBN #1 is composed of 8 physical blocks of PBA #1 and each of 8 physical blocks of PBA #1 are included in each of the flash memories 2a to 2h, and the following virtual blocks is composed similarly of 8 physical blocks whose PBAs are the same value. Hereinafter, a virtual block formed in this way is referred as a "temporary virtual block".

As for each of temporary virtual blocks formed in this way, it is determined whether or not a defective block is included among 8 physical blocks composing a temporary virtual block, and then a temporary virtual block including at least one defective block is extracted from the temporary virtual blocks. Temporary virtual blocks not extracted in this extraction are allocated to available virtual blocks. In other words, it is decided to treat temporary virtual blocks not extracted in this extraction as available virtual blocks. Each of virtual blocks hereupon decided, which correspond to temporary virtual blocks not extracted, is composed of 8 physical blocks whose PBAs are the same value.

Each of temporary virtual blocks extracted in the above extraction includes at least one defective block among 8 component physical blocks thereof. Replacement to replace a defective block with a normal block (not defective block) is performed among temporary virtual blocks extracted in the above extraction. The replacement is performed so as to generate a temporary virtual block including no defective block. Specifically, the replacement is performed so as to treat some of the temporary virtual blocks extracted in the above extraction as available virtual blocks. This replacement will be described with reference to FIG. 13. In FIG. 13, PBN of 8 physical blocks composing a temporary virtual block, for each temporary virtual block extracted in the above extraction, is shown. Hereupon, PBA corresponding to the defective block is enclosed in parentheses "( )". In this example shown in FIG. 13, a physical block of PBA #7, which belongs to a temporary virtual block of VBN #7, in the flash memory 2c, a physical block of PBA #15, which belongs to a temporary virtual block of VBN #15, in the flash memory 2f, a physical block of PBA #101, which belongs to a temporary virtual block of VBN #101, in the flash memory 2b, and so on are a defective block. In this replacement, in some temporary virtual blocks, one or more defective blocks belonging thereto are replaced with one or more normal blocks (not defective blocks), hereinafter such a temporary virtual block referred as a "demand virtual block", and in the other temporary virtual blocks, one or more normal blocks (not defective blocks) belonging thereto are used as a replacement for a defective block, hereinafter such a temporary virtual block referred as a "supply virtual block".

In this embodiment, in selecting a demand virtual block, a temporary virtual block of small VBN precedes that of large VBN, in selecting supply virtual block, a temporary virtual block of large VBN precedes that of small VBN. In other words, a demand virtual block is selected in order from a temporary virtual block whose VBN is relatively small, and a supply virtual block is selected in order from a temporary virtual block whose VBN is relatively large. Specifically, a temporary virtual block of large VBN (supply virtual block) gives a normal block (not defective block) to a temporary virtual block of small VBN (demand virtual block), and a defective block belonging to a temporary virtual block of small VBN (demand virtual block) is replaced with the normal block (not defective block). Also, replacement to replace the defective block with the normal block (not defective block) is performed among the physical blocks included in the same flash memory (chip). Specifically, a defective block, which belongs to a demand virtual block, included in the flash memory 2a is replaced with a normal block (not defective block), which belongs to a supply virtual block, included in the flash memory 2a, a defective block, which belongs to a demand virtual block, included in the flash memory 2b is replaced with a normal block (not defective block), which belongs to a supply virtual block, included in the flash memory 2b, the replacement is performed similarly in the flash memory 2c to 2g, and a defective block, which belongs to a demand virtual block, included in the flash memory 2h is replaced with a normal block (not defective block), which belongs to a supply virtual block, included in the flash memory 2h.

In the example shown in FIG. 13, a physical block (defective block) of PBA #7 belonging to a temporary virtual block of VBA #7 is replaced with a physical block (normal block) of PBA #1016 belonging to a temporary virtual block of VBA #1016 in the flash memory 2c. By the replacement, a temporary virtual block of VBA #7 becomes an available virtual block. Next, a physical block (defective block) of PBA #15 belonging to a temporary virtual block of VBA #15 is replaced with a physical block (normal block) of PBA #1016 belonging to a temporary virtual block of VBA #1016 in the flash memory 2f. By the replacement, a temporary virtual block of VBA #15 becomes an available virtual block. The replacement to replace a defective block with a normal block (not defective block) continues as far as any temporary virtual blocks extracted in the above extraction can become an available virtual block. Specifically, the replacement continues as far as a temporary virtual block to which no defective block belongs can be newly generated from temporary virtual blocks extracted in the above extraction. It is decided to treat the newly generated temporary virtual blocks, in each of which all the defective blocks belonging thereto are replaced with the normal block (not defective block) belonging to the other temporary virtual block, as an available virtual block. Specifically, using each of the newly generated temporary virtual blocks, to which no defective block belongs, as a virtual block is allowed.

Among temporary virtual blocks extracted in the above extraction, temporary virtual blocks except the newly generated temporary virtual blocks are allocated to virtual blocks to be not used. Specifically, use of a temporary virtual block in which all the defective blocks belonging thereto were not replaced with the normal block (not defective block) is forbidden. Hereinafter, a virtual block to be not used, of which use is forbidden, is referred as a "defective virtual block". Therefore, in a defective virtual block, a defective block is left belonging thereto. Defective virtual blocks are managed using the defective virtual block management table as shown in FIG. 14. In the defective virtual block management table, information indicating VBN of each defective virtual block and PBAs of the normal blocks (not defective blocks) belonging thereto is held. In the defective virtual block management table shown in FIG. 14, information indicating #690, #740, #773, #862, #900, #997, and #773 as information indicating VBNs of defective virtual blocks is held. Therefore, by referring to the defective virtual block management table, it is found that the virtual blocks of VBN #690, #740, #773, #862, #900, #997, and #773 are defective virtual blocks. Information indicating PBAs of normal blocks (not defective blocks) belonging to each defective virtual block is also held. Also, in the defective virtual block management table, each of defective virtual blocks is related to normal blocks (not defective blocks) belonging thereto. Incidentally, information indicating a defective block, shown as "DB" in FIG. 14, is held in a location, which is included in the defective virtual block management table, corresponding to the defective block. Incidentally, in defective blocks belonging to each defective virtual block, some defective blocks originally belong thereto and the other defective blocks come to belong thereto by the replacement.

The memory controller 3 holds the sums, each of which is the number of the normal blocks (not defective blocks) belonging to defective virtual blocks for each flash memory (chip), obtained by counting the normal blocks (not defective blocks) belonging defective virtual blocks entered in the defective virtual block management table in each flash memory (each of the flash memories 2a to 2h). For example, in a case where VBNs of the 7 defective virtual blocks are entered in the defective virtual block management table as shown in FIG. 14, counting normal blocks (not defective blocks) for each flash memory (chip) will be described.

In the flash memory 2a, because physical blocks belonging to defective virtual blocks of VBN #690, #740, and #773 are normal blocks (not defective blocks), the sum which is the number of normal blocks (not defective blocks) in the flash memory 2a is 3. In the flash memory 2b, because physical blocks belonging to defective virtual blocks of VBN #690, #740, #773, and #900 are normal blocks (not defective blocks), the sum which is the number of normal blocks (not defective blocks) in the flash memory 2b is 4. Hereinafter, similarly, the sum in the flash memory 2c is 4, the sum in the flash memory 2d is 5, the sum in the flash memory 2e is 0, the sum in the flash memory 2f is 2, the sum in the flash memory 2g is 4, the sum in the flash memory 2h is 3. Hereupon, if the smallest one among the sums, each of which is the number of normal blocks (not defective blocks) by a flash memory (chip), is not 0, a virtual block to which is no defective block belongs can be generated by the replacement to replace a defective block with a normal block (not defective block).

In a case where any of physical blocks composing a virtual block which is used in the ordinary operations becomes defective block, additional entry to enter the virtual block as a defective virtual block in the defective virtual block management table is performed. When the additional entry is performed, the sums, each of which is the number of normal blocks (not defective blocks) for each flash memory (chip), are updated. As a result, in a case where the smallest one of the updated sums becomes 1 or more than 1, a virtual block to which no defective block belongs can be generated by the replacement to replace a defective block with a normal block (not defective block).

In a case Where an available virtual block is newly generated by replacing a defective block with a normal block (not defective block) among defective virtual blocks, entry of the generated virtual block is canceled in the defective virtual block management table. In the cancel of entry, information relating to the newly generated virtual block is deleted from the defective virtual block management table.

Incidentally, operations to generate a virtual block available may be performed at a time when the smallest one among the sums, each of which is the number of normal blocks (not defective blocks) for each flash memory (chip), becomes 1 or more. Also, the operations may be performed at a time when the smallest one of the sums equals or exceeds a predetermined value (threshold).

Hereupon, when the smallest one of the sums, each of which is the number of normal blocks (not defective blocks) belonging to defective virtual blocks entered in the defective virtual block management table for each flash memory (chip), equals or exceeds the predetermined value (threshold), all the sums equals or exceeds the predetermined value (threshold). Therefore, determining whether or not the smallest one of the sums in the flash memories 2a to 2h equals or exceeds the predetermined value (threshold) and determining whether or not all the sums equals or exceeds the predetermined value (threshold) are the same result substantially. For example, assuming that predetermined value (threshold) is 5 and the sum in the flash memory 2e is the smallest, all the sums equal or exceed 5 properly at a time when the sum in the flash memory 2e equals or exceeds 5.

For example, in a case where the predetermined value (threshold) is 5, the memory controller 3 may seek the smallest one of the 8 sums in the flash memories 2a to 2h, may determine whether or not the sum found equals or exceeds 5, and may determine whether or not operations to generate an available virtual block are performed in a basis of the previous determination. Specifically, in a case where predetermined value (threshold) is 5, the memory controller 3 may perform the operations to generate an available virtual block when the smallest one of the 8 sums equals or exceeds 5. Also, the memory controller 3 may determine whether or not all the 8 sums equal or exceed 5, and may perform operations to generate an available virtual block in a case where all the 8 sums equal or exceed 5.

Next, structure of the buffer memory 9 will be described in detail. In this embodiment, a capacity of a logical page equals that of a user area included in a virtual page and data to be held in the buffer memory 9 is managed by a logical page, that is, data corresponding to the one logical page are one unit of data held in the buffer memory 9. Specifically, In this embodiment, because a capacity of a user area included in one virtual page is 64 sectors and a capacity of one logical page is 64 sectors, the buffer memory 9 is divided into the buffer pages each having a capacity of 64 sectors. Also, information indicating a logical page corresponding to data held in each buffer page is held and managed, or the relationship between data held each buffer page and a logical page corresponding thereto is managed.

The buffer page having a capacity of 64 sectors are shown in FIG. 15. Logical sectors of SN #0 to #63 included in a logical page are respectively assigned to 64 unit areas each having a capacity of a sector (512 bytes) in order of increasing SN. Specifically, in a direction from the first unit area of the 64 unit areas composing a buffer page to the last unit area (the 64th unit area) of them, the logical sectors of SN #0 to #63 are respectively assigned in order of increasing SN. Therefore, the first unit area of the 64 unit areas corresponds to the logical sector of SN #0, the 2nd unit area of the 64 unit areas corresponds to the logical sector of SN #1, the 3rd unit area to the 63rd unit area of the 64 unit areas correspond to logical sectors of SN #2 to #62 respectively, the 64th unit area of the 64 unit areas corresponds to logical sector of SN #63. Incidentally, each logical page is assigned to scope of 64 sectors to which a series of LBAs in an address space managed by the host system 4 corresponds. Therefore, in a case where a logical page corresponds to scope of LBA #n to #(n+63), logical sectors of SN #0 to #63 included in the logical page correspond to LBA #n to #(n+63) respectively.

Data held in buffer pages of BPN #0 to #15 is shown in FIG. 16. The memory controller 3 maintains information indicating whether or not write data (WD), shown as "WD" in FIGS. 16 to 18, are held in each unit area. In FIG. 16, each buffer page is composed of 64 unit areas each having a capacity of a sector, and write data (WD), which are supplied from the host system 4, are held in the 64 unit areas by sector (512 bytes). In each of buffer pages, data corresponding to a logical page assigned thereto are held. For example, in a buffer page of BPN #0 shown in FIG. 16, write data (WD) are not held in unit areas corresponding to logical sectors of SN #0 to #3, #12 to #15, #44 to #47, and #60 to #63. In the management of information indicating whether or not a write data (WD) are held, for example, the 64 unit areas composing each buffer page may be respectively assigned to 64 bits and information of the 64 bits is managed so that a logical value, "0" or "1", of each of the 64 bits indicates whether or not data are held in a unit area corresponding thereto. In a case where a logical value "0" indicates that data are not held in a unit area and a logical value "1" indicates that data are held in a unit area, each logical value is "0" about bits to which unit areas corresponding to logical sectors of SN #0 to #3, #12 to #15, #44 to #47, and #60 to #63 is assigned and each logical value is "1" about bits to which unit areas corresponding to logical sectors of SN #4 to #11, #16 to #43, and #48 to #59 is assigned.

Because data writing to the flash memory 2 is performed in virtual pages, update (rewrite) of data stored in the flash memory 2 is performed in logical pages. Specifically, new data replaces old data by a logical page. Therefore, when write data (WD) held in a buffer page are written to physical pages composing a virtual page, a unit area(s) in which the write data (WD) are not held is filled with data stored in the flash memory 2. After a unit area(s) included a buffer page in which write data (WD) are not held has been filled with data, data held in the buffer page are written to physical pages composing a virtual page. Therefore, in the data writing, data corresponding to a unit area(s) in which the write data (WD) are not held are not updated (rewritten). Specifically, about data corresponding to a unit area(s) in which the write data (WD) are not held, data read from the flash memory 2 are written to the flash memory 2 as it stands.

Operations performed in a case where write data (WD) held in a buffer page of BPN #3 are written to physical pages composing a virtual page will be described as an example. In the example shown in FIG. 16, write data (WD) are not held in unit areas corresponding to logical sectors of SN #0 to #3 and #60 to #63 in the buffer page of BPN #3. Therefore, data corresponding to a logical page assigned to buffer page of BPN #3 are read from the flash memory 2, then the read data, which are data read from the flash memory 2, corresponding to logical sectors of SN #0 to #3 and #60 to #63, shown as "RD" in FIGS. 17 to 18, are written to unit areas corresponding to the logical sectors of SN #0 to #3 and #60 to #63 in the buffer page of BPN #3 respectively. Specifically, read data (RD) read from the flash memory 2 are held in unit areas in which write data (WD) are not held. As shown in FIG. 17, after read data (RD) have been held in unit areas corresponding to logical sectors of SN #0 to #3 and #60 to #63 in buffer page of BPN #3, write data (WD) and read data (RD) held in buffer page of BPN #3 are written to the flash memory 2. Specifically, after read data (RD) have been held in unit areas in which write data (WD) are not held, write data (WD) are written to the flash memory 2 together with read data (RD) held in the same buffer page.

A method for efficiently filling free unit areas not holding write data (WD) in a buffer page with the read data (RD) read from the flash memory 2 will be described with reference to FIG. 18A to 18C. When an access request for data writing is supplied from the host system 4, in a case where there is not a buffer page corresponding to a logical page to which a designated sector(s) designated by the access request belongs, (in a case where there is not a buffer page corresponding to a logical page to which LBA of a designated sector(s) designated by the access request corresponds), the logical page to which the designated sector(s) belongs is newly assigned to a free buffer page. Hereupon, the logical page to which the designated sector(s) belongs is assigned to free buffer page of BPN #4. Hereinafter, the logical page assigned to free buffer page of BPN #4 is referred as "the logical page A".

As shown in FIG. 18A, write data (WD), which is supplied from the host system 4, corresponding to the logical page A are held in buffer page of BPN #4. In parallel with holding write data (WD) in the buffer page of BPN #4, data corresponding to the logical page A are read from the flash memory 2 and the read data (RD) corresponding to the logical page A are held in a buffer page of BPN #7, which is a free buffer page, as shown in FIG. 18B. Specifically, write data (WD) corresponding to the logical page A, which are new data supplied from the host system 4, are held in buffer page of BPN #4 and read data (RD) corresponding to the logical page A, which are old data read from the flash memory 2, are held in the buffer page of BPN #7.

In the example shown in FIG. 18A, write data (WD) corresponding to the logical page A are held in unit areas corresponding to logical sectors of SN #12 to #47, but they are not held in unit areas corresponding to logical sectors of SN #0 to #11 and #48 to #63. Therefore, unit areas corresponding to logical sectors of SN #0 to #11 and #48 to #63 are filled with read data (RD) corresponding to the logical page A. Because read data (RD) corresponding to the logical page A are held in a buffer page of BPN #7, unit areas corresponding to the logical sectors of SN #0 to #11 and #48 to #63 are filled with read data (RD) corresponding to the logical page A by transferring the read data (RD) from a buffer page of BPN #7 to a buffer page of BPN #4. Specifically, in the data transfer, as shown in FIG. 18C, read data (RD) held in unit areas corresponding to logical sectors of SN #0 to #11 and #48 to #63 in a buffer page of BPN #7 are transferred to unit areas corresponding to logical sectors of SN #0 to #11 and #48 to #63 in a buffer page of BPN #4 respectively. Incidentally, by performing the data transfer, updated data corresponding to the logical page A are formed. The updated data corresponding to the logical page A are composed of write data (WD) and read data (RD) not replaced with the write data (WD).

Incidentally, it is preferable that transfer of read data (RD) is performed after a logical page to which a designated sector(s) designated by an access request belongs shift to the different logical page. Specifically, the transfer of the read data (RD) is not performed while an access request for data writing of data corresponding to the logical page A is supplied. Also, it is preferable that the transfer of the read data (RD) starts after the access request for data writing of data corresponding to a different logical page from the logical page A is supplied. In above description, data are transferred from a buffer page in which read data (RD) are held to that in which write data (WD) are held, but data may be transferred from that in which write data (WD) are held to that in which read data (RD) are held in a case where the amount of data to be transferred in the reverse direction is smaller. Specifically, it is preferable to determine which of read data (RD) and write data (WD) are transferred so that the amount of data to be transferred is smaller. If the amount of write data (WD) held in buffer page of BPN #4 is smaller than 32 sectors, it is preferable that the write data (WD) are transferred from buffer page of BPN #4 to that of BPN #7. In a case where the write data (WD) are transferred from buffer page of BPN #4 to that of BPN #7, after completion of the transfer, information indicating the relationship between buffer pages and logical pages is updated so as to assign the logical page A, which was assigned to the buffer page of BPN #4, to a buffer page of BPN #7.

Thus, holding write data (WD) in one buffer page and holding read data (RD) in another buffer page are performed in parallel, then data transfer between buffer page in which write data (WD) are held and that in which read data (RD) are held is performed. As a result, unit areas, which is included in the buffer page, in which write data (WD) are not held can be efficiently filled with read data (RD) corresponding to the same logical page as the write data (WD). In other words, new data corresponding to the write data (WD) replace partial data of old data corresponding to the read data (RD) by the data transfer. As a result, data composed of the old data and the new data are efficiently formed. Further, the amount of write data (WD) held in a buffer page is managed and it is determined whether or not the amount of write data (WD) equals or exceeds half of the amount of the maximum data to be hold in a buffer page when a data transfer are performed. The maximum data to be hold in a buffer page equal all data corresponding to one logical page. Specifically, read data (RD) are transferred from a buffer page in which the read data (RD) are held to that in which write data (WD) are held in a case where the amount of the write data (WD) held in a buffer page equals or exceeds half of the amount of the maximum data to be held therein, while write data (WD) are transferred from a buffer page in which the write data (WD) are held to that in which read data (RD) are held in a case where the amount of the write data (WD) held in a buffer page is smaller than half of the amount of the maximum data to be held therein: As a result, efficiency is further increased.

In foregoing specification, specific embodiments of the present invention have been described. However, the scope of the present invention is not limited to the embodiment. Of course, various modifications and changes can be made without departing from the scope of the present invention. For example, the structure of the virtual block management table, the buffer management table, the destination management table, the source management table, and the defective virtual block management table can be modified or changed as far as a function of each table can be executed. The number of physical blocks composing the virtual block, the relationship between logical sectors included in a logical page and sector areas included in physical pages composing a virtual page, and so on are practicable in various configurations. It is practicable to define various conditions as a condition of performing operations to generate a virtual block from defective virtual blocks entered in the defective virtual block management table.

What is claimed is:

1. A memory controller for controlling access to one or more flash memories, in which data writing and data reading are performed in physical pages and data erasing is performed in physical blocks each composed of a plurality of physical pages, comprising:

a logical page forming unit which forms logical pages each composed of a plurality of logical sectors each assigned a logical address provided from a host system;

a data holding unit which has a plurality of unit areas each for holding data corresponding to one logical page;

a management unit which manages a relationship between the logical pages and the unit areas;

a control unit which writes data provided from the host system to one or more unit areas of the unit areas according to the relationship between the logical pages and the unit areas managed by the management unit;

a first access unit which stores data held in one or more unit areas of the unit areas in the flash memory;

a second access unit which reads data from the flash memories and write the read data to one or more unit areas of the unit areas; and a data transfer unit which transfers data from any one of the unit areas to another unit area of the unit areas;

wherein first operations and second operations are performed in parallel, wherein the first operations are operations for the control unit to write first data to a first unit area which is any one of the unit areas, wherein the second operations are operations for the second access unit to read second data corresponding to the same logical page as first data from the flash memories and write the second data to a second unit area which is any one of the unit areas and different from the first unit area, wherein the data transfer unit performs data transfer between the first unit area and the second unit area so as to form data composed of the first data and a portion of the second data which is not replaced with the first data, and wherein the data transfer unit transfers the first data from the first unit area to the second unit area in a case where a total amount of the first data is smaller than a half amount of data corresponding one logical page, and transfers the second data from the second unit area to the first unit area in a case where a total amount of the first data equals or exceeds a half amount of data corresponding to one logical page.

2. The memory controller according to claim 1, further comprising:

a virtual block forming unit which forms virtual blocks each composed of a plurality of physical blocks each included in each of the flash memories;

a first virtual block management unit which maintains identification information to identify physical blocks composing each of the virtual blocks formed by the virtual block forming unit;

a relationship management unit which manages a relationship between logical blocks each composed of a plurality of logical pages and the virtual blocks formed by the virtual block forming unit;

a second virtual block management unit which forbids use of a virtual block to which at least one defective physical block newly generated belongs;

a defective virtual block management unit which manages a virtual block of which use is forbidden by the second virtual block management unit as a defective virtual block; and a third virtual block management unit which generates a virtual block to which no defective physical block belongs by replacing a defective physical block belonging to one defective virtual block with a normal physical block belonging to another defective virtual block among defective virtual blocks and allows use of the virtual block generated.

3. A flash memory system comprising:
the memory controller according to claim 1; and
one or more flash memories to which access is controlled by the memory controller.

4. A flash memory system comprising:
the memory controller according to claim 2; and
a plurality of flash memories to which access is controlled by the memory controller.

5. A method for controlling access to one or more flash memories, in which data writing and data reading are performed in physical pages and data erasing is performed in physical blocks each composed of a plurality of physical pages, comprising the steps of:

forming logical pages each composed of a plurality of logical sectors each assigned a logical address provided from a host system;

managing a relationship between the logical pages and a plurality of unit areas each for holding data corresponding to one logical page writing data provided from the host system to one or more unit areas of the unit areas according to the relationship between the logical pages and the unit areas managed in the step of managing the relationship;

storing data held in one or more unit areas of the unit areas in the flash memory;

reading data from the flash memories and write the read data to one or more unit areas of the unit areas; and transferring data from any one of the unit areas to another unit area of the unit areas;

wherein first operations and second operations are performed in parallel, wherein the first operations are operations to write first data to a first unit area which is any one of the unit areas, wherein the second operations are operations to read second data corresponding to the same logical page as first data from the flash memories and write the second data to a second unit area which is any one of the unit areas and different from the first unit area, and wherein, in the step of transferring data, data transfer is performed between the first unit area and the second unit area so as to form data composed of the first data and a portion of the second data which is not replaced with the first data, wherein, in the step of transferring data, transferring the first data from the first unit area to the second unit area in a case where a total amount of the first data is smaller than a half amount of data corresponding one logical page, and transferring the second data from the second unit area to the first unit area in a case where a total amount of the first data equals or exceeds a half amount of data corresponding to one logical page.

6. The method according to claim 5, further comprising the steps of:

forming virtual blocks each composed of a plurality of physical blocks each included in each of the flash memories;

maintaining identification information to identify physical blocks composing each of the virtual blocks formed by the virtual block forming unit;

managing a relationship between logical blocks each composed of a plurality of logical pages and the virtual blocks formed in the step of forming the virtual blocks;

forbidding use of a virtual block to which at least one defective physical block newly generated belongs;

managing a virtual block of which use is forbidden in the step of forbidding the use of the virtual block, as a defective virtual block;

generating a virtual block to which no defective physical block belongs by replacing a defective physical block belonging to one defective virtual block with a normal physical block belonging to another defective virtual block among defective virtual blocks; and allowing use of the virtual block generated.

* * * * *